United States Patent
Steele, III et al.

(10) Patent No.: US 9,405,851 B1
(45) Date of Patent: Aug. 2, 2016

(54) FLEXIBLE CACHING

(71) Applicant: Shape Security, Inc., Mountain View, CA (US)

(72) Inventors: Oscar H. Steele, III, Pompano Beach, CA (US); Justin D. Call, Santa Clara, CA (US)

(73) Assignee: Shape Security, Inc., Palo Alto, CA (US)

( * ) Notice: Subject to any disclaimer, the term of this patent is extended or adjusted under 35 U.S.C. 154(b) by 0 days.

(21) Appl. No.: 14/542,994

(22) Filed: Nov. 17, 2014

Related U.S. Application Data

(62) Division of application No. 14/160,105, filed on Jan. 21, 2014, now Pat. No. 8,893,294.

(51) Int. Cl.
| | | |
|---|---|---|
| G06F 17/00 | (2006.01) | |
| G06F 17/30 | (2006.01) | |
| G06F 17/22 | (2006.01) | |

(52) U.S. Cl.
CPC ...... *G06F 17/30905* (2013.01); *G06F 17/2247* (2013.01)

(58) Field of Classification Search
CPC .................................................. G06F 17/2247
See application file for complete search history.

(56) References Cited

U.S. PATENT DOCUMENTS

| | | | |
|---|---|---|---|
| 6,938,170 B1 | 8/2005 | Kraft et al. | |
| 6,957,229 B1* | 10/2005 | Dyor ................ | G06F 17/30873 |
| 7,117,429 B2 | 10/2006 | Vedullapalli et al. | |
| 7,480,385 B2 | 1/2009 | Weber | |
| 7,500,099 B1 | 3/2009 | McElwee et al. | |
| 7,707,223 B2 | 4/2010 | Zubenko et al. | |
| 7,793,220 B1 | 9/2010 | Liang et al. | |
| 7,836,425 B2 | 11/2010 | Rubin et al. | |
| 8,020,193 B2 | 9/2011 | Bhola et al. | |
| 8,200,958 B2 | 6/2012 | Coppola et al. | |

(Continued)

FOREIGN PATENT DOCUMENTS

| | | |
|---|---|---|
| GB | 2443093 A | 4/2008 |
| WO | WO9964967 | 12/1999 |
| WO | WO00/72119 | 11/2000 |
| WO | WO02/093369 | 11/2002 |
| WO | WO02088951 | 11/2002 |
| WO | WO2004109532 | 12/2004 |
| WO | WO2008095018 | 8/2008 |

(Continued)

OTHER PUBLICATIONS

Anderson et al., "Measuring the Cost of Cybercrime," 2012 Workshop on the Economics of Information Security (WEIS), [retrieved on Oct. 15, 2013]. Retrieved from the Internet: <URL: http://web.archive.org/web/20130623080604/http://weis2012.econinfosec.org/papers/Anderson_WEIS2012.pdf>, 31 pages , Jun. 2012.

(Continued)

*Primary Examiner* — Keith Bloomquist
(74) *Attorney, Agent, or Firm* — Fish & Richardson P.C.

(57) ABSTRACT

This document describes, among other things, a computer-implemented method that can include receiving, from a web server system, web page code to be provided over the internet to a computing device. The web page code can correspond to a particular web page served by the web server system. The method may include generating an intermediate representation of at least a portion of the web page code, and comparing the intermediate representation to a prior intermediate representation of the particular web page. Based on a result of the comparison, the method can include determining what portion of the web page code to analyze for re-coding of the web page code before serving the web page code to the computing device.

23 Claims, 7 Drawing Sheets

(56) References Cited

U.S. PATENT DOCUMENTS

| | | | |
|---|---|---|---|
| 8,225,401 | B2 | 7/2012 | Sobel et al. |
| 8,266,202 | B1 | 9/2012 | Colton et al. |
| 8,332,952 | B2 | 12/2012 | Zhang et al. |
| 8,347,396 | B2 | 1/2013 | Grigsby et al. |
| 8,527,774 | B2 | 9/2013 | Fallows et al. |
| 8,533,480 | B2 | 9/2013 | Pravetz et al. |
| 2002/0052878 | A1* | 5/2002 | Brandin .............. G06F 17/2247 |
| 2002/0099827 | A1 | 7/2002 | Shah et al. |
| 2002/0188631 | A1 | 12/2002 | Tiemann et al. |
| 2004/0162994 | A1 | 8/2004 | Cohen et al. |
| 2006/0007464 | A1* | 1/2006 | Percey ................ G06F 17/2247 358/1.13 |
| 2007/0011295 | A1 | 1/2007 | Hansen |
| 2007/0027671 | A1* | 2/2007 | Kanawa .............. G06F 17/2247 704/4 |
| 2007/0074227 | A1 | 3/2007 | Naidu et al. |
| 2007/0079285 | A1 | 4/2007 | Cook et al. |
| 2008/0222736 | A1 | 9/2008 | Boodaei et al. |
| 2008/0228789 | A1* | 9/2008 | Asakawa ............. G06F 17/227 |
| 2008/0250310 | A1* | 10/2008 | Chen ................... G06F 17/2247 715/234 |
| 2008/0270409 | A1* | 10/2008 | Naito ................... G06F 17/218 |
| 2009/0193513 | A1 | 7/2009 | Agarwal et al. |
| 2009/0249310 | A1 | 10/2009 | Meijer et al. |
| 2009/0282062 | A1 | 11/2009 | Husic |
| 2009/0282349 | A1* | 11/2009 | Olsen ................... G06F 9/4443 715/760 |
| 2010/0100927 | A1 | 4/2010 | Bhola et al. |
| 2010/0235637 | A1 | 9/2010 | Lu et al. |
| 2010/0235910 | A1 | 9/2010 | Ku et al. |
| 2010/0257354 | A1 | 10/2010 | Johnston et al. |
| 2010/0262780 | A1* | 10/2010 | Mahan .............. G06F 17/30902 711/118 |
| 2011/0015917 | A1 | 1/2011 | Wang et al. |
| 2011/0022846 | A1 | 1/2011 | Ginter et al. |
| 2011/0131416 | A1 | 6/2011 | Schneider |
| 2011/0154021 | A1 | 6/2011 | McCann et al. |
| 2011/0178973 | A1 | 7/2011 | Lopez et al. |
| 2011/0202847 | A1* | 8/2011 | Dimitrov ............. G06F 3/0481 715/738 |
| 2011/0296391 | A1 | 12/2011 | Gass et al. |
| 2012/0011262 | A1 | 1/2012 | Cheng et al. |
| 2012/0022942 | A1 | 1/2012 | Holloway et al. |
| 2012/0096116 | A1 | 4/2012 | Mislove et al. |
| 2012/0124372 | A1 | 5/2012 | Dilley |
| 2013/0091582 | A1 | 4/2013 | Chen et al. |
| 2013/0198605 | A1* | 8/2013 | Nicola ................ G06F 17/2247 715/234 |
| 2013/0198607 | A1 | 8/2013 | Mischook et al. |
| 2013/0232234 | A1 | 9/2013 | Kapur et al. |
| 2013/0238975 | A1* | 9/2013 | Chan ................ G06F 17/30902 715/234 |
| 2013/0263264 | A1 | 10/2013 | Klein et al. |
| 2014/0089786 | A1 | 3/2014 | Hashmi |
| 2014/0281535 | A1 | 9/2014 | Kane et al. |
| 2015/0135061 | A1* | 5/2015 | Palanichamy ...... G06F 17/2247 715/235 |

FOREIGN PATENT DOCUMENTS

| | | |
|---|---|---|
| WO | WO2008095031 | 8/2008 |
| WO | WO2008130946 | 10/2008 |
| WO | WO2010/046314 | 4/2010 |
| WO | WO2013091709 | 6/2013 |

OTHER PUBLICATIONS

CodeSealer, "CodeSealer," codesealer.com [online] 2013 [captured Aug. 29, 2013]. Retrieved from the Internet: <URL: http://web.archive.org/web/20130829165031/http://codesealer.com/technology.html>, 2 pages.

Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.

Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.

Entrust, "Defeating Man-in-the-Browser Malware," Entrust.com [online] Sep. 2012 [retrieved Oct. 15, 2013]. Retrieved from the Internet: <URL: http://download.entrust.com/resources/download.cfm/24002/>, 18 pages.

Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pages.

Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.

RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.

Rutkowska, "Rootkits vs. Stealth by Design Malware," Black Hat Europe, 2006. Retrieved from the Internet: <URL: http://www.blackhat.com/presentations/bh-europe-06/bh-eu-06-Rutkowska.pdf> 44 pages.

SafeNet, "Prevent Financial Fraud and Man-in-the-Browser Attacks," safenet-inc.com [online] [retrieved on Oct. 15, 2013]. Retrieved from the Internet: <URL: http://www.safenet-inc.com/solutions/data-protection/financial-services/financial-fraud-man-in-the-browser-attacks/>, 1 page.

Sood and Enbody, "A Browser Malware Taxonomy," Virus Bulletin, Jun. 2011. Retrieved from the Internet: <URL: http://www.secniche.org/released/VB_BRW_MAL_TAX_AKS_RJE.pdf>, 5 pages.

Sood and Enbody, "Browser Exploit Packs—Exploitation Tactics," Virus Bulletin Conference, Oct. 2011, Retrieved from the Internet: <URL: http://www.secniche.org/papers/VB_2011_BRW_EXP_PACKS_AKS_RJE.pdf>, 9 pages.

Sood et al., "The Art of Stealing Banking Information—Form grabbing on Fire," Virus Bulletin, Nov. 2011, Retrieved from the Internet: <URL: http://www.virusbtn.com/virusbulletin/archive/2011/11/vb201111-form-grabbing>, 5 pages.

Team Cymru, "Cybercrime—an Epidemic," Queue, 4(9):24-35, Nov. 2006, Retrieved from the Internet: <URL: http://trygstad.rice.iit.edu:8000/Articles/Cybercrime%20-%20An%20Epidemic%20-%20ACM%20Queue.pdf>, 3 pages.

Trusteer, "Trusteer Rapport for Online Banking," [online] 2013 [captured Nov. 5, 2013]. Retrieved from the Internet: <URL: http://web.archive.org/web/20130511162210/http://www.trusteer.com/products/trusteer-rapport-for-online-banking>, 2 pages.

Vasco, "Hardened Browser," vasco.com [online] [retrieved on Oct. 15, 2013]. Retrieved from the Internet: <URL: http://www.vasco.com/products/client_products/pki_digipass/hardened_browser.aspx>, 2 pages.

Currie et al., "In-the-wire authentication: Protecting client-side critical data fields in secure network transactions," 2nd International Conference on Adaptive Science and Technology, 2009, pp. 232-237.

Li et al., "WebShield: Enabling various web defense techniques without client side modifications," In Proceedings of the 18th Annual Network and Distributed System Security Symposium (NDSS), 2011, 18 pages.

Matsunaka et al., "Detecting and Preventing Drive-By Download Attack via Participative Monitoring of the Web," In Information Security (Asia JCIS), 2013 Eighth Asia Joint Conference on Information Security, pp. 48-55. doi: 10.1109/ASIAJCIS.2013.15.

Sedaghat et al., "On-the-fly web content integrity check boosts users' confidence"; Nov. 2002; Communications of the ACM, vol. 45 Issue 11; Publisher: ACM; pp. 33-37.

* cited by examiner

FLEXIBLE CACHING

CROSS-REFERENCE TO RELATED APPLICATIONS

This application is a divisional of and claims priority to U.S. application Ser. No. 14/160,105, filed Jan. 21, 2014, the entire contents of which are incorporated herein by reference.

TECHNICAL FIELD

This application generally relates to computer security.

BACKGROUND

Content is generally delivered to computers over the internet (and using Web technologies) under the HTTP specification, which defines the format for requests for data and responses to those requests. Under that specification, the GET method is used to request data from a specified resource, while the POST method submits to a specified resource data that is to be processed. A server system may respond to such methods by transmitting content, such as web page content (using, e.g., HTML, JavaScript, and the like) to the requesting computer (e.g., desktop, laptop, smartphone, watch, or tablet).

Certain requests may be made frequently and may result in the same content being served. Such repeated requests can place a load on an originating server system and on the network, and can also lead to latency in the operation of the requesting computer. As a result, information can be cached to address some of these issues. For example, a server system can cache information that does not change and may perform "expensive" operations on it only periodically, and instead serve a more static version of the information. Also, components in the network (e.g., at large internet service providers) can save copies of some web pages, serve those cached copies across multiple requests, and only periodically obtain up-to-date copies from the original server system. And at the client, information can also be cached—e.g., if a user moves quickly to a page and then arrows back to a prior page, a browser might not fetch the prior page, but may instead rely on a version of the page that was acquired before the user moved to the second page.

SUMMARY

This document discusses systems and methods for providing security in an efficient manner to operators (e.g., on-line retailers or banks) that serve content over the internet. The security may be provided by making changes to web page code that is normally static, where the changes are made differently each time the web page code is served—producing polymorphic code that is difficult for malware to exploit because it presents a "moving ball" to the malware. The changes may be made by an intermediary system that sits between client computers that request content, and a web server system that serves the content. The intermediary system may make the changes in the served code, and may make inverse changes to responses received from client computers that render the web page content (i.e., so that the web server understands the requests), and may also identify illegitimate attempts on the client computer to interact with the content (e.g., software that uses a function name that is in the original code but is replaced in the re-coded code, could indicate that the software is a bot or other malware, because it interacts with the "wrong" version of the code).

In order to make such changes consistently across different web resources related to a web page (e.g., the HTML and CSS for the page itself, to JavaScript code referenced from the HTML code, and other relevant code), the web page code needs to be analyzed for connections within and between the pieces of code, and such analysis can be computationally expensive.

To lower the level of analysis needed to serve web page code, the systems and techniques below may form intermediate representations of the web page code the first time a page is served (or even before the page is requested), and may identify and map active content in the code (content that changes between different requests from the web server that originates the page, such as content that is specific to a particular user who requests the page or content that changes frequently over time) and connections between and among different pieces of the code. The intermediate representations may include, for example, DOMs (Document Object Models) made from HTML code, ASTs (Abstract Syntax Trees) from JavaScript code, and ASTs from style sheets. The static elements may then be re-coded to interfere with malware, and the system may store information that indicates locations and relationships between elements that are part of the web page code on the one hand, and elements that are not in the web page code, on the other hand (referenced here as "supplemental" content, which may be content from other systems and other domains than the system that served the web page code).

When the same page is later to be served (e.g., because a different user (via a different computing device) requests it or the same user requests it later), the web server system may again pass the primary content to the intermediary system. That system may then create intermediate content out of the second-served web page and compare it to the intermediary content that was previously created for the first-served web page. If the two match, then there is no relevant dynamic content that has changed in the code to be served, and the intermediary system may simply re-code the page by making changes that produce a polymorphic representation of the code and that are not visible to the user (e.g., by changing names of elements in the code to essentially random or arbitrary alphanumeric representations). Such an effort is much less expensive than was the initial analysis and re-coding, so that, in effect, the system gains the benefit of caching an analyzed copy of the web page content.

If the second-served intermediate representation does not match the first-served intermediate representation of the content, additional analysis may be performed. The additional, second-time-around analysis may be relatively limited and more efficient, however, than an initial, full analysis would be. In particular, the analysis may use information from the comparison to identify areas in the content that have changed from the prior serving. Also, a map that identifies the prior changes that were made and the links between the changed portions of the content, may be consulted so that any changes needed in the subsequent serving may be propagated through the content. Such propagation may be through the "internal" content that is provided by the web server system, and the supplemental content that the internal content references. Thus, only the portion of the material that is affected by the change in the material will need to be re-analyzed. The mapping and other meta data may then be updated and stored (for use when the web page is next requested), the static elements of the code may be substituted as dictated by the analysis (to create polymorphism in the code), and the code may be served.

In this manner, web content may be constantly re-coded to create moving target for malware, in a complex manner that requires knowledge of interconnections in the code (both internal and supplemental), but in an efficient manner that does not require re-analysis of all the interconnections each time the content is served even if the original content is itself changing. Such techniques may also permit, in certain implementations, the caching of POST requests and GET requests with query strings in a safe manner, which are not generally cachable under specification.

In some implementations, a computer-implemented method can include receiving, from a web server system, web page code to be provided over the internet to a computing device, the web page code corresponding to a particular web page served by the web server system; at least partially executing the web page code to generate an intermediate representation of the web page code; comparing the intermediate representation to a prior intermediate representation of the particular web page; and based on a result of the comparison, determining what portion of the web page code to analyze for re-coding of the web page code before serving the web page code to the computing device.

These and other implementations can optionally include one or more of the following features. The method can further include recoding a portion of the web page code that has been previously re-coded in a prior serving of the web page code, and not recoding another portion of the web page code that has been previously re-coded in the prior serving of the web page code. If the result of the comparison is a determination that the intermediate representation fully matches the prior intermediate representation, then the web page code can be re-coded without performing analysis of the web page code to replace analysis that was previously performed. The prior intermediate representation may have been created and saved in response to a prior request for the web page by the computing device or another computing device. Generating the intermediate representation can include creating a document object model from HTML code.

The method can further include using a mapping between elements of the web page code to identify elements that are to be re-coded before serving the web-page code, the mapping having been generated as part of an analysis of the web page code performed before a request for the web page was received from the computing device. The method can further include updating the mapping based on a re-analysis of the web page code, the re-analysis being performed on portions of the web page code identified as being different between the intermediate representation and the prior intermediate representation. Prior to receiving a request from the computing device, the method can include determining that the web page code has not been previously analyzed, and analyzing the web page code to identify connections between elements in the web page code, wherein the connections represent repeated uses of element names that are invisible to a user at a browser that renders the web page code. The method can include creating and storing a mapping of the connections between elements in the web page code for use in later analysis of the web page code. The mapping can define connections between elements within web page code served by the web server system, and between the web page code served by the web server system and web page code served by other server systems. The method can include repeatedly serving the web page code by replacing elements of the web page code with different arbitrarily-selected names in different servings of the web page code so as to interfere with malware that attempts to interact with the web page code.

In some implementations, a computer-implemented method can include receiving content to be provided to a requesting computing device over the internet; converting, using a first method, the received content into an intermediate representation of the received content; comparing the intermediate representation to a prior intermediate representation that was converted using the first method; and based on a result of the comparison, determining what portion of the content to analyze for re-coding of the content before serving the content to the computing device.

These and other implementations can optionally include one or more of the following features. The intermediate representation and the prior intermediate representation can both include document object models created from the content. If the result of the comparison is a determination that the intermediate representation fully matches the prior intermediate representation, then the content can be re-coded without performing analysis of the content to replace analysis that was performed in a prior serving of the content. Generating the intermediate representation can include creating a document object model from HTML code. The method can further include using a mapping between particular elements in the content to identify elements that are to be re-coded before serving the content, the mapping having been generated as part of an analysis of the content performed before a request for the content was received from the computing device. The method can further include updating the mapping based on a re-analysis of the content, the re-analysis being performed on portions of the content identified as being different as between the intermediate representation and the prior intermediate representation.

In some implementations, a computer-implemented system can include stored maps that correlate web code elements whose representations in web code are dependent on each other, and locations of the web code elements; a comparator executable on one or more processors and programmed to determine whether a first representation of web page code matches a second representation of the web page code, and to effect a particular analysis of the web page code based on the determination; and an analysis module programmed to perform analysis of the web page code based on the determination made by the comparator, and using the stored maps.

These and other implementations can optionally include one or more of the following features. Representations of the web page code can include document object models formed from the web page code. The stored maps can correlate web code elements served by a first server system with (a) other web code elements served by the first server system, and (b) other web code elements served by a second server system that is operated by an organization separate form an organization that operates the first server system. The representations of the web page code can include abstract syntax trees formed from the web page code.

In yet another implementation, a computer-implemented method comprises analyzing code for a web page to identify portions that do not change, and caching an analyzed copy of the code for the web page. The cached materials may include the initial code for the web page, along with pointers that identify portions of the code that can be changed from one serving of the code to a next serving of the code so as to interfere with malware attempts to exploit the code. The pointers may also identify similar elements across different files in the code, such as HTML, CSS, and JavaScript files, so that changes in serving the code may be made consistently across the code. At a next serving of the web page, a process may first determine whether the page has changed with respect to any element identified during the first analysis as being an element to be changed from one serving of the code to the next. If no such element has changed, the pointers from the initial analysis may be applied to the most recent serving of code, the changes may be applied according to the initial analysis, and the page may be served as modified according to the initial analysis. If any of the elements has changed since the initial analysis, additional analysis may be performed for that element, though not for the entire set of code for the web page, and the pointers or other elements for mapping changes may be updated accordingly, and then used to modify the code for the current serving and for future servings of the code.

Other features and advantages will be apparent from the description and drawings, and from the claims.

DESCRIPTION OF DRAWINGS

Like reference symbols in the various drawings indicate like elements.

DETAILED DESCRIPTION

Figure 1A:
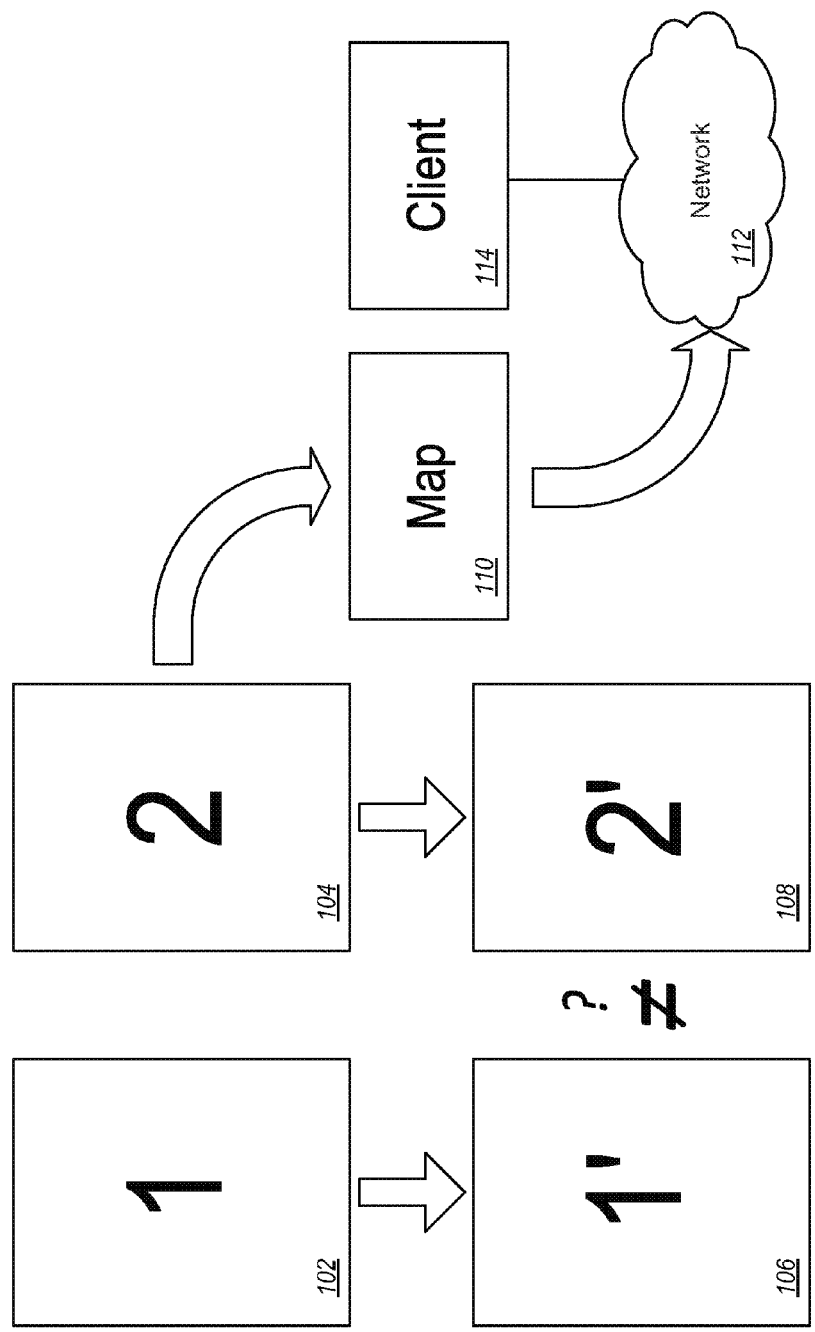
FIG. 1A is a conceptual diagram of an example system for analyzing and re-coding web content using caching techniques.

FIG. 1A is a conceptual diagram of the analysis and re-coding of web content in a cached system 100. The presentation here is highly schematic so as to represent certain operations at a general level of abstraction in an effort to better explain the overall operation of the system 100. Generally, the processes performed by the system 100 and depicted in the figure relate to efforts to improve the manner in which web pages and other resources and can be served so as to present polymorphic coding to client devices that request such resources. Polymorphic code is generally code that changes over multiple servings in manners that do not relate to the presentation that is ultimately made by the code at a client, but is instead "behind the scenes," so that the changes interfere with the ability of malware to exploit the code, while not interfering with a good and consistent user experience for the code that is served.

In the figure, pages 102 and 104 represent the code for two different servings of a particular resource, such as the web page code for www.example.com/index.html. The code may include a number of components, such as mark-up code (HTML), CSS, and JavaScript, among other things. Certain of the code may be the same each time it is generated by or for a web server system, and certain may change, such as code that is specific to the particular user requesting the code.

Pages 106, 108 represent intermediate representations of each of the two to-be-served versions of the resource, where the intermediate representations may be DOMs or other such representations. The intermediate representations may better represent the operative code within the pages 102, 104 and provide a mechanism by which to identify functional changes that have occurred in the code between the two servings. As indicating by the equality/inequality question between the pages 106, 108, the pages 106, 108 may be tested to determine whether they match, and also where and how they match or do not match. That determination may lead to a determination of what portions of the code need to be analyzed to determine how polymorphism rules are to be applied in processing the code when it is served. A prior analysis may have been performed with respect to page 102, and may have resulted in the creation of a map 110 of changes to be made to the code. The comparison may then be used to perform a limited subsequent analysis (e.g., only re-analyzing portions that the comparison shows to require re-analysis) rather than a full re-analysis, and to them update the map for use in re-coding the resource for subsequent servings.

As indicated, the re-coded code may be served through network 112 to a client 114 that requested the code. Such comparisons of intermediate code and updating of the map may occur continuously over time, with each request and serving of the resource, so that the system dynamically updates the map 110. These techniques may allow the system 100 to avoid conducting a full re-analysis each time the resource is to be served, and in many instances, to avoid any reanalysis because the comparison indicates that such re-analysis is not necessary due to the type of changes made in the code between servings.

Figure 1B:
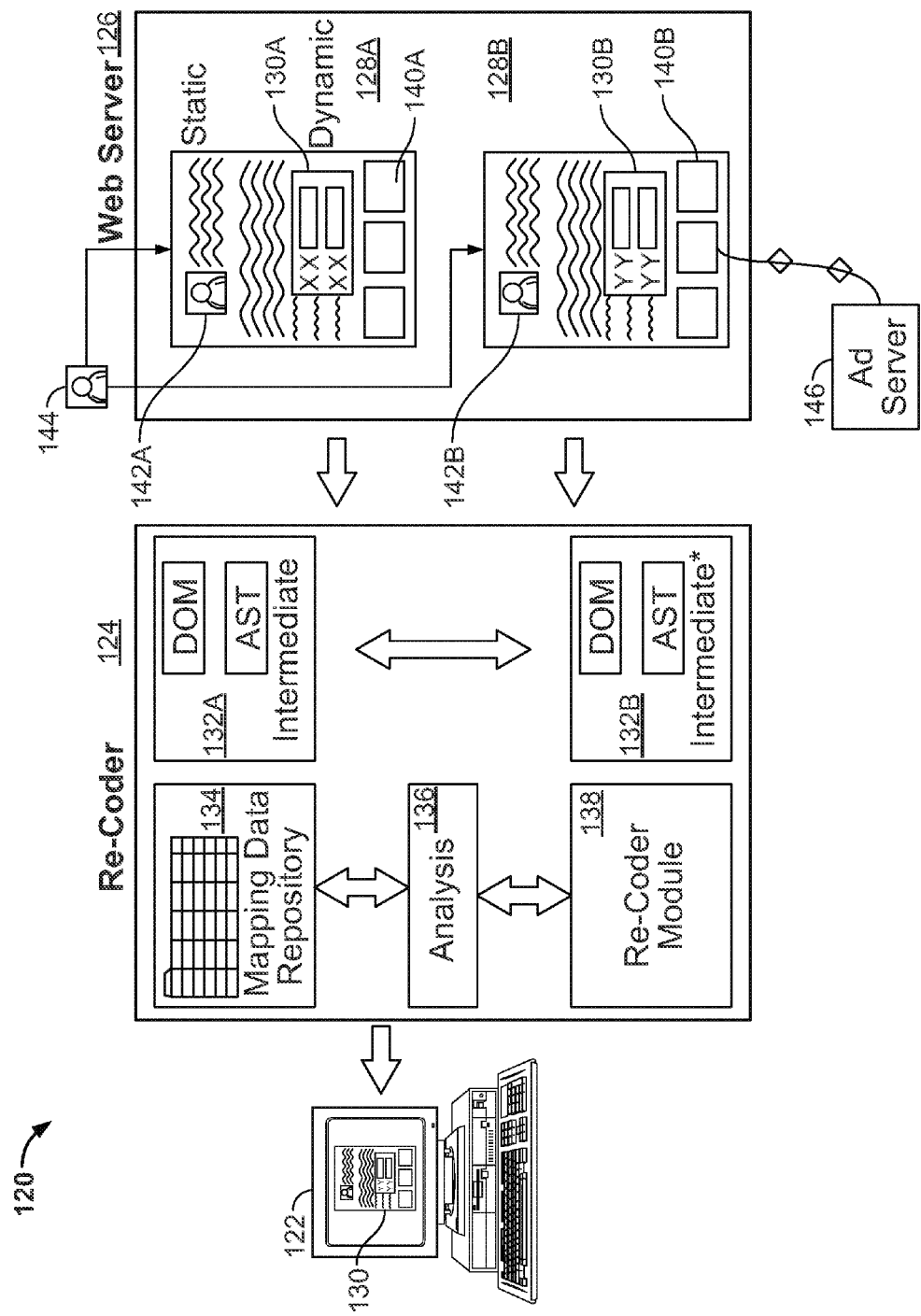
FIG. 1B is a schematic diagram of a system for analyzing, in a cached manner, web code for re-coding.

FIG. 1B depicts a schematic diagram of an example system 120 for analyzing, in a cached manner, web code provided by a web server 126 prior to being delivered to a requesting client device 122. In general, the system 120 is directed to safely modifying web code so as to interfere with attempts by third-parties and third-party software to exploit the web server 126, an organization that operates the web server 126, and/or users or customers that interact with the web server 126. For example, web code that is served by the web server 126 in response to an HTTP request originating from a client device 122 may include elements, such as forms, that enable users to submit information to the web server 126, which may include personal data such as social security numbers, banking and payment information, or other personally identifying information. In order to thwart attempts by malware or other software to determine the content or structure of web code served to the client device 122, or to carry out other attacks (e.g., phishing, modifying user input, listening for user input), the system 120 can modify the web code for a particular resource each time the resource is served. For example, a user that corresponds to a first client device 122 and another user that corresponds to a second client device 122 may each request a common resource from the web server 126 multiple times, in different sessions, for example. Each time the common resource is served, the re-coder 124 can modify the web code underlying the resource differently so that a different version of the web code is served each time to each different client device 122, as well as in each session or request from the same client device 122. The modifications do not generally impact the presentation or functionality of the resource from the user's perspective, but they create a moving target that makes it more difficult for the web code to be exploited.

The system 120 is generally configured to analyze web code from one or more resources in response to a request, and to perform coordinated modifications or other re-coding of the web code. For instance, to satisfy a request for a particular resource, both primary content and supplemental content may be served to the client device 122, and re-coded modifications between the primary and supplemental content are coordinated so that the presentation and functionality of the resource does not appear to the user to have been changed when executed by the client device 122. Primary content is generally the specific resource requested by the client device 122, and supplemental content generally includes one or more resources that are referenced by the primary content and that are generally served to the client device in addition to the primary content so as to support complete execution of the requested resource.

In one example, a user may direct the client device 122 to request a web page from http://www.example.com using an HTTP GET request method. The web server 126 responds to the request by serving index.html, which may be hosted by the web server 126. The index.html file includes primary content because it is the file that is served directly in response to the HTTP request. Moreover, index.html may include various types of web code such as HTML, JavaScript, inline CSS, and others. The primary content in index.html may reference various external resources that define supplemental content for the web page, such as JavaScript, CSS, HTML, images, applets, and more that are provided in separate files. The supplemental content may be hosted by the same web server 126 that hosts the primary content, or they may be hosted by other web servers and on other domains. Together, the primary content and supplemental content operate to provide a complete user experience for the requested resource at the client device 122.

FIG. 1B generally depicts a system 120 that includes a network of computing devices that include client device 122, re-coder subsystem 124, and web server 126. In some implementations, the system 120 shown in FIG. 1B can be implemented by like components in system 200 that is described below with respect to FIG. 2, described below. In some implementations, systems 120 and system 200 can be the same system. The web server 126 is generally configured to receive requests for resources over a network and to respond to such requests by serving resources (e.g., web pages, multimedia, files, documents, etc.). Requests can be made to the web server by a client computing device 122. FIG. 1B illustrates a single instance of a client device 122, but in practice, many client devices 122 such as desktop computers, notebook computers, mobile devices, and the like, may communicate with and submit requests to the web server 126. The client device 122 can communicate with the re-coder 124 and web server 126 over any appropriate network such as the Internet, a wired local area network, wireless local area network, or other networks. The re-coder subsystem 124 is generally located in the network between the client device 122 and the web server 126. The re-coder 124 intercepts communications between the client device 122 and the web server 126, and can act as a reverse proxy such that requests addressed to the web server 126 are first received and processed by the re-coder 124 before being forwarded to the web server 126. Additionally, the re-coder 124 processes responses from the web server 126 to, for example, re-code resources in the responses, before forwarding the processed responses to the client device 122.

FIG. 1B generally depicts two versions of a web page, 128A and 128B, respectively, that are served and re-coded in a cached manner in response to respective requests for the web pages 128A and 128B from the client device 122. Each version of the web page 128A, 128B can be nominally located at a common URL or other web address. However, web pages 128 and 128B may include portions of content or structure that differ from each other. For example, web page 128A may have been requested at an earlier time than web page 128B, and in the interim time, the page may have been updated or otherwise modified. Or, web page 128A may include content that is custom for a particular user, while web page 128B may include content that is custom for another user (e.g., the users' names if they are currently logged in with the system). In one example, the web pages 128A and 128B may include portions of different content resulting from personalization based on an identity of the requesting user or client device. The portions of content (or structure) of the web pages 128A, 128B that have not been modified or that are otherwise equivalent is referred to as static content. For instance, the displayed text of each version of the web pages 128A, 128B is unchanged and is therefore static. The displayed text is also included in the respective HTML files that are directly served in response to a request, and so the displayed text is also primary content. The two versions of the web page 128A, 128B are also shown to include supplemental static content in images 142A and 142B. The images 142A and 142B can be referenced, for example, by an <img> tag in the pages' HTML code. The images 142A and 142B are thus external to the web page code itself, and therefore constitute supplemental content. Moreover, because the images 142A and 142B are unchanged, they are static content.

The web pages 128A, 128B also include dynamic content that differs between respective requests for the web pages. For example, the web pages 128A, 128B have dynamic primary content illustrated by tables 130A and 130B. The content of the tables may depend on some specific information known about respective users who submitted the requests for the web pages 128A or 128B. For example, the requests from client device 122 can include information that identifies the user to the web server, such as a cookie stored by a web browser on the client device 122, so that personalized information may be determined to populate the content of tables 130A and 130B. For instance, the web server may use the cookie, an IP address, or other means to determine a location associated with the request and local news or weather content can be provided in the primary content of the web page in tables 130A and 130B.

The respective versions of the web pages 128A and 128B also include dynamic supplemental content. The examples of dynamic supplemental content depicted in FIG. 1B are externally referenced advertisements that are targeted or otherwise customized to particular users. For example, in responding to a request for a first user who is known to have an interest in automobiles and mechanics, the web page 128A is served along with an auto-mechanic related advertisement 140A. The advertisement is supplemental because it may be referenced with JavaScript code that calls for an appropriate advertisement to be provided from an external advertisement server 146. The second web page 128B is served in response to a request from a different user who may, for example, have interests in live stage productions. The ad server 146 can thus provide different advertisements 140B related to the user's interest in live stage productions, for example.

The re-coder subsystem 124 coordinates re-coding of web code, in a cached manner, of primary content and supplemental content associated with a particular requested resource (e.g., web page). Generally, the re-coder 124 retrieves both primary and supplemental content that is to be served in response to a particular request, and analyzes the content to ensure that re-coding modifications are safely made among the multiple pieces of content in a way that does not break the presentation or functionality of the resource. For example, a web page may include various form fields that are configured to receive user input and that are identified by particular names in the HTML tags that specify the form fields. JavaScript functions that are provided in supplemental content may be programmed to perform various operations with respect to the form fields. Accordingly, if the re-coder 124 modifies the original names of the form fields as provided by the web server 126, the re-coder 124 can coordinate the name change with respective portions of the JavaScript code that reference the form fields so as to maintain functionality of the JavaScript code. Likewise, similar modifications may be made to other supplemental content such as CSS, plugins, applets, and the like in a coordinated fashion with modifications of the primary HTML content before the content is ultimately served to the client device 122.

The re-coder 124 generally analyzes web code to be served using caching techniques that reduce the expensive computational processes associated with such analysis and that can also reduce the latency in responding to client requests. As described, in order to safely re-code a resource within and among multiple pieces of content, the system 120 first analyzes the multiple pieces of content to identify their interrelationships. Using the results of such analysis, the re-coder 124 applies coordinated modifications to web code that correspond to both primary and supplemental content (e.g., changing form field names in HTML code and making corresponding changes to JavaScript functions that reference the form field names). The processes for performing such analysis can be computationally expensive and increase latency in responding to client requests. Therefore, the re-coder 124 may cache the results of analyses for particular resources so that when a resource that has previously been analyzed is subsequently requested, the re-coder 124 can reuse at least a portion of the cached analysis without having to perform the entire analysis all over again. Caching can be beneficial because many web resources include a substantial amount of static content that changes relatively infrequently. When the static content in a resource has not been updated between multiple requests for the resource, the re-coder 124 can forgo analysis of the static content, and instead use a cached analysis of the static content to apply coordinated re-coding modifications in the manner described herein.

The example re-coder 124 shown in FIG. 1B includes several modules for performing analysis and re-coding of requested web resources. An analysis module 136 generally performs the analysis of a resource provided by the web server 126 so that the resource can be safely re-coded. Results of the analysis are cached or otherwise recorded in data repository 134. After a resource has been analyzed, or the re-coder 124 has determined that a previously cached analysis of the resource may be reused, the re-coder module 138 generates re-coded code for the resources that is then transmitted to the client device 122.

In the schematic diagram of FIG. 1B, the first version of the web page 128A is initially provided to the re-coder 124 in response to a first request for the web page. The re-coder 124 determines that the web page has not been previously analyzed by the re-coder 124, or that any previous analysis that may have been done is no longer available or is no longer usable. The web page 128A is then processed by the analysis module 136 in the re-coder 124.

The analysis module 136 performs a detailed initial analysis of the web page 128. The aim of the analysis is to collect all the information that is needed to safely and efficiently re-code the web page in a manner that obscures its operation without affecting the presentation or functionality of the page. The analysis module 136 analyzes the primary and supplemental content of the web page 128A to identify the location, and interrelationships between elements in the page 128A. Such analysis may be done with respect to the original web code or upon one or more intermediate presentations of the web page 128A, or both. For example, the analysis module 136 can parse the web code for the web page 128A to generate intermediate representation 132A of the web page 128A. The intermediate representation 132A may be a unified structure or it may include multiple parts that correspond to different types of web code in the web page 128A. For instance, a Document Object Model (DOM) can be generated as an intermediate representation of HTML code, and Abstract Syntax Trees (ASTs) can be generated for JavaScript code or CSS style sheets in some implementations.

In one example, the intermediate representation of the web page 128A is used to identify and record information about elements in the web page. Location and other positional information of elements, the extent of the elements, and cross-references between elements, whether in primary or supplemental content, are recorded. The recorded information can be stored (e.g., cached) in data repository 134, such in a table or database, and information about the elements can be correlated between their representations in the original web code and in the intermediate representation of the web page 128A. For example, the analysis module 136 may identify the static text from primary content of the web page 128A, the dynamic primary content such as the personalized weather information in table 130A, the static supplemental content referenced by, e.g., an <img> tag for image 142A, and the dynamic supplemental content referenced by, e.g., JavaScript code to load an advertisement 140A from remote ad server 146. Interrelationships among the elements are recorded so that the re-coder module 138 can apply consistent changes between interrelated elements. For example, if CSS selectors or JavaScript functions refer to particular HTML elements, the relationship would be noted so that a name or ID of the HTML elements is re-coded consistently with a re-coded reference from the CSS or JavaScript.

After the web page 128A has been analyzed, the results of the analysis are recorded and then used by the re-coder module 138 to safely re-code the web page 128A. The re-coder subsystem 124 then forwards the re-coded web page 128A to client device 122 that requested the web page 128A.

Next, a client device 122 submits a subsequent request to the web server 126 for the same web page that was made in the initial request. However, a context of the subsequent request may be different in a way that causes a modified version of the web page 142B to be served rather than the originally served version of the page 128A. For example, dynamic content on the page may be updated periodically to reflect current news, weather information, social media activity, and more. In some examples, a location associated with the request or an identifier of the user or client device may cause the web page 128B to change from a version that was previously served to the first user under different circumstances.

The re-coder 124 intercepts the web page 128B before it is delivered to client device 122 and determines whether the web page has been previously analyzed. If a web page or other resource has not been previously analyzed, then the analysis module 136 will perform a detailed analysis as described above and below with respect to FIG. 3C, for example. Because an earlier version of web page 128A was previously analyzed, however, the re-coder 124 may not perform a complete re-analysis of the page. Generally, using cached analysis results from data repository 134 based on a previous analysis of a requested resource will is faster and less computationally intensive than a detailed re-analysis of the resource.

Upon determining that web page 128B corresponds to a previously analyzed resource, the re-coder 124 compares representations of the earlier version 128A and latest version of the web page 128B. The comparison may be between original web code representations of the web pages 128A and 128B, such as by performing a byte-by-byte analysis, and/or comparing intermediate representations of the page. For example, cached DOM and AST representations of the earlier web page 128A can be compared against like DOM and AST representations generated for the subsequent webpage 128B. Regions of modified content are determined in the primary and supplemental content so that the re-coder knows what portions of the web page have changed. For instance, the dynamic content including table 130 and advertisement 140 have changed since the system 120 responded to the original request for the web page.

The re-coder 124 then uses the information about modified regions of content in the web page 128B to update portions of the cached analysis results. In this way, the re-coder 124 avoids doing a complete re-analysis and analysis results that pertain to static content does not need to be changed. Instead, the re-coder 124 identifies the relevant elements from the cached analysis results for the web page that correspond to modified elements in 128B, and updates location or other positional information, extent indicators, and cross-references among the elements as appropriate to reflect the changes in the web page 128B. However, because the re-coder 124 is able to reuse much of the initial analysis of web page 128A, including the analysis of static content, the re-coder 124 is able to operate more efficiently than if a complete re-analysis of the same resource was required each time that a web page was requested.

In some cases, where the requested web page or other resource is completely static, the re-coder does not need to update analysis results at all, and previous analysis results can be re-used completely. When the re-coder 124 updates analysis results for dynamic content, the updated results can be cached and re-used for the next time the resource is requested. Even with dynamic pages, analysis results can be re-used completely in many instances. That is because the dynamic portion of a page or other resource may be content that is separate from the modifications that are being made to the page (e.g., ads, weather, or a table of data related to the requesting user, rather than modified tables and JavaScript). As a result, all analysis may be able to be re-used even with highly dynamic pages or other such resources.

Figure 2:
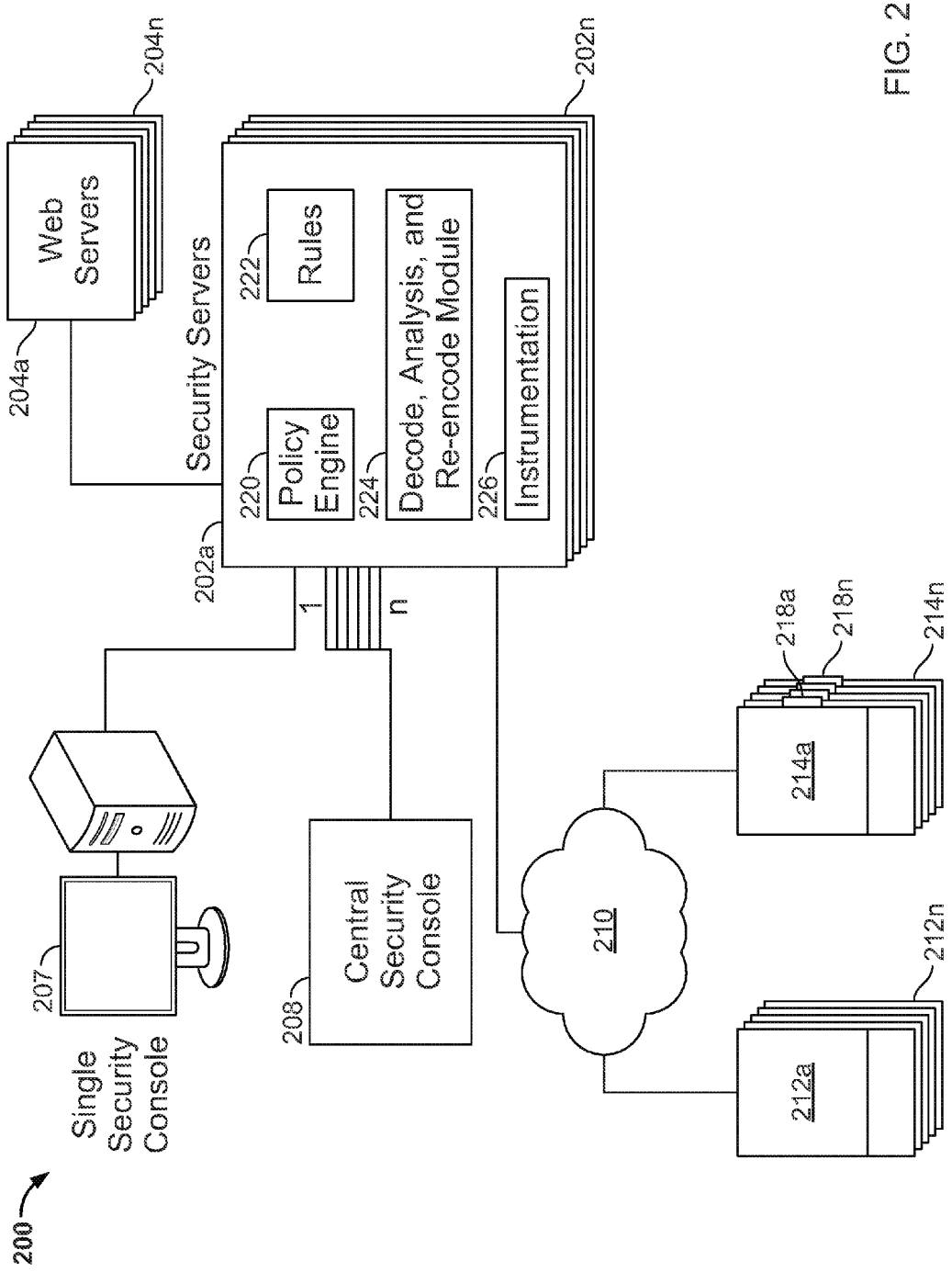
FIG. 2 is a schematic diagram of a system for performing deflection and detection of malicious activity with respect to a web server system.

FIG. 2 is a schematic diagram of a system for performing deflection and detection of malicious activity with respect to a web server system. The system 100 may be the same as the system 100 discussed with respect to FIG. 1A, and is shown in this example to better explain the interrelationship of various general features of the overall system 200, including the use of instrumentation code for detection and deflection that is discussed in greater detail throughout this document.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie or other hidden parameter that is saved at the relevant client computer. The client computer may then pass that cookie or other hidden parameter data back when it passes the information that needs to be decoded back to its original status. With the cookie or other hidden parameter data, the system 202 may use a private key or shared secret to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3A:
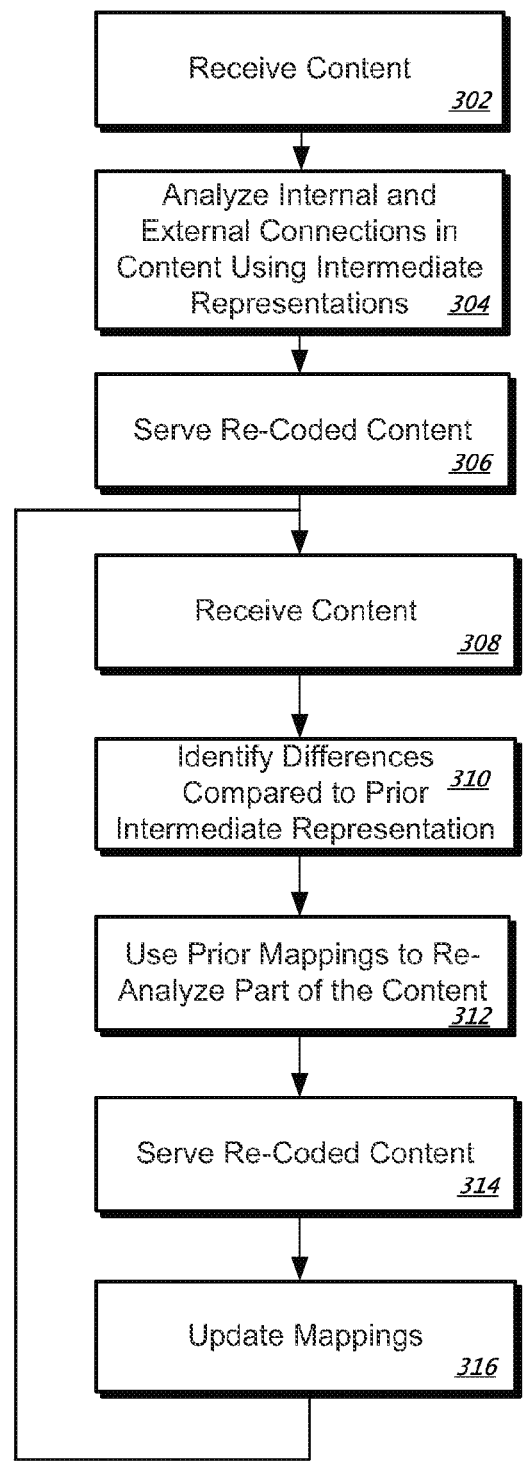
FIGS. 3A and 3B are flow charts of an example process for analyzing, in a cached manner, web code for re-coding.

FIG. 3A depicts a flowchart of an example process for analyzing, in a cached manner, web code that is to be re-coded in advance of being ultimately transmitted to a client device. The depicted process may be implemented, for example, by the systems in FIGS. 1A, 1B, and/or 1C.

The process can begin at box 302, where content is received, for example, by re-coder 124. The content may be any form of web code provided by web server 126, or from other sources, in response to a request from a client device 122. The content may include primary and supplemental content. Primary content includes web code that is served directly in response to a request, whereas supplemental content is generally other, external content that the primary content refers to as part of a complete representation of the requested resource. For example, a client device 122 may transmit an HTTP request for a webpage, "home.html," to a web server 126 that serves the domain, www.example.com. Responsive to the request, the web server 126 locates or generates the home.html file, and provides the file to re-coder 124 for analysis, re-coding, and delivery to the client device 122. The HTML code within home.html constitutes primary content. However, the page can also include references to various external articles such as styles, scripts, and images that are to be loaded and executed in conjunction with home.html to provide a complete experience for the webpage. These referenced articles constitute supplemental content. Supplemental content may be hosted by the same domain and web server that hosts the primary content or it may be hosted by another domain and/or web server. Moreover, some portions of the received content may be static, while other portions may be dynamic. Static content changes relatively infrequently, and in particular does not change each time a requested resource is served. Dynamic content, in contrast, may be personalized and time-dependent such that it changes or otherwise varies each time a resource is served. For example, home.html may include a site banner and navigation menu that is static because it does not change from one request to the next, whereas a portion of the page that includes targeted advertisements may frequently be updated for a given user, and may also vary among different users each time the page is served.

At box 304, an initial analysis of the received content is performed. FIG. 3C describes additional detail about the process of initially analyzing content. Generally, an initial analysis is performed whenever the content has not been previously analyzed or when cached analysis results for the content are unavailable or expired. With reference again to the example of home.html, the re-coder 124 can determine whether the webpage has been previously analyzed, and if not, then it will proceed to perform a full, initial analysis of the page. Otherwise, the process may proceed to box 310.

Content is analyzed in order to determine how the content can be safely re-coded without affecting the presentation or function of the content when it is loaded on the client computing device 122. For example, the re-coder 124 may be configured to re-code content in different ways each time it is served so as to create a moving target that obfuscates the operation of a web server and that thwarts unwanted attempts to compromise the content. For re-coding to work properly without disrupting the user's experience with the content, the content can be analyzed to ensure that all transformations in the re-coding are safe and that the transformations are coordinated among all interrelated elements of the content. For example, home.html may include certain <div> and <span> HTML tags that have particular identifiers corresponding to identifiers referenced in an external stylesheet. During initial analysis, the re-coder 124 can determine the connections between these tags and the stylesheet, so that the identifiers may be later re-coded to maintain such connections.

During initial analysis, the entirety of the received content is generally analyzed to determine and record all internal and external connections in the content. In some implementations, this can be accomplished using one or more intermediate representations of the received content. For example, the home.html page may be parsed into a DOM tree structure to represent the page. Using the DOM intermediate representation of the page, connections between elements within the page may be identified between nodes in the DOM. Other types of intermediate representations may also be generated, including, for example, Abstract Syntax Trees for JavaScript code. The process can also identify external connections, such as connections between elements in primary content and elements in supplemental content. For example, home.html may include a reference to an external JavaScript file, and any connections that are determined between the HTML and JavaScript can be recorded using identifiers for the connected elements in the intermediate representations of the content. Results of the initial analysis are stored in a cached manner that enables later re-use of all or a portion of the analysis when a later request for the content is made.

At box 306, upon completion of the initial analysis, the content is re-coded and served to the client computing device 122 that requested the content. The re-coded content includes different web code than the code that was originally provided by the web server that hosts the content, but it is re-coded in a manner that does not substantially affect the presentation or functionality of the web page from the user's perspective. For example, hidden forms may be inserted in the code, and various elements of the code may be renamed so that the code is processed differently by the client computing device 122, even though such changes would not be obvious from a user's normal interaction with the webpage. The re-coding process uses the results of the initial analysis to ensure that only safe transformations are made during re-coding.

At box 308, content is received at a later time that is related to the content that was previously received at box 302. For instance, the content can correspond to a resource has previously been requested, analyzed, cached, re-coded, and served. Thus, is one example, the content received at box 308 may have been provided from a web server in response to a subsequent request for a resource that is located at the same web address as the resource that was previously received in box 302, such as home.html. As described above, the content may include any form of web code such as HTML, CSS, and JavaScript, and may be comprised of various combinations of primary and supplemental content, and static and dynamic content. The content, whether primary or supplemental, may have changed from when it was previously received, or it may be the same.

Upon receiving the content, the process proceeds to box 310, where differences are identified between the subsequently received content from box 308 and the previously received content from box 302. If the content includes both static and dynamic content, then the static portions may be unchanged, and the dynamic portions may be different. For example, the static banner logos and navigation menus in home.html may be defined by the same web code in both the previous and subsequent versions of the page, and is therefore unchanged. However, dynamic content that corresponds to targeted advertisements and a personalized dashboard for the page may differ between the earlier and later versions of the page. The differences between the pages can be identified in any suitable manner, including by a comparison of intermediate representations of the pages. For example, the re-coder 124 can parse the most recently received version of home.html into an appropriate intermediate representation such a DOM tree structure or Abstract Syntax Trees, and then identify which portions of the intermediate representations are changed and which portions are unchanged.

At box 312, the process uses cached results from the initial analysis of the received content to safely re-code the subsequently received content. By reusing at least a portion of the initial analysis, which can be a computationally expensive process, the subsequently received content can be re-coded and served more efficiently. To re-use the cached analysis results, the re-coder 124 or other system that implements the process, identifies the portions of the content that have changed, and updates its analysis for the content only with respect to those portions of the content that are impacted by the changes. For example, the targeted advertisement in home.html that changed from the first version to the second may include JavaScript function names or parameters that have changed so as to cause the displayed advertisement to change. The re-coder 124 can identify the elements in the cached analysis results that correspond to the changed elements in the JavaScript code, and update these elements accordingly. However, the portions of the cached analysis results that correspond to static content in the page and that are not impacted by the updated advertisement or other changes, can be re-used without analyzing the full extent of the page again. In cases where the subsequently received content has not changed at all from the previously received content, the cached initial analysis results can be re-used in whole without needing to do any new analysis of the subsequent content.

Using the updated analysis results from box 312, the process then re-codes the subsequently received content, serves the re-coded content to a client device at box 314, and updates the mappings of elements in the cached analysis results at box 316. Thereafter, when another request for the content is made, the process returns to box 308, where the updated analysis results are used in analyzing and re-coding the content in a cached manner. Further implementations of the process will now be described with reference to FIGS. 3B and 3C.

Figure 3B:
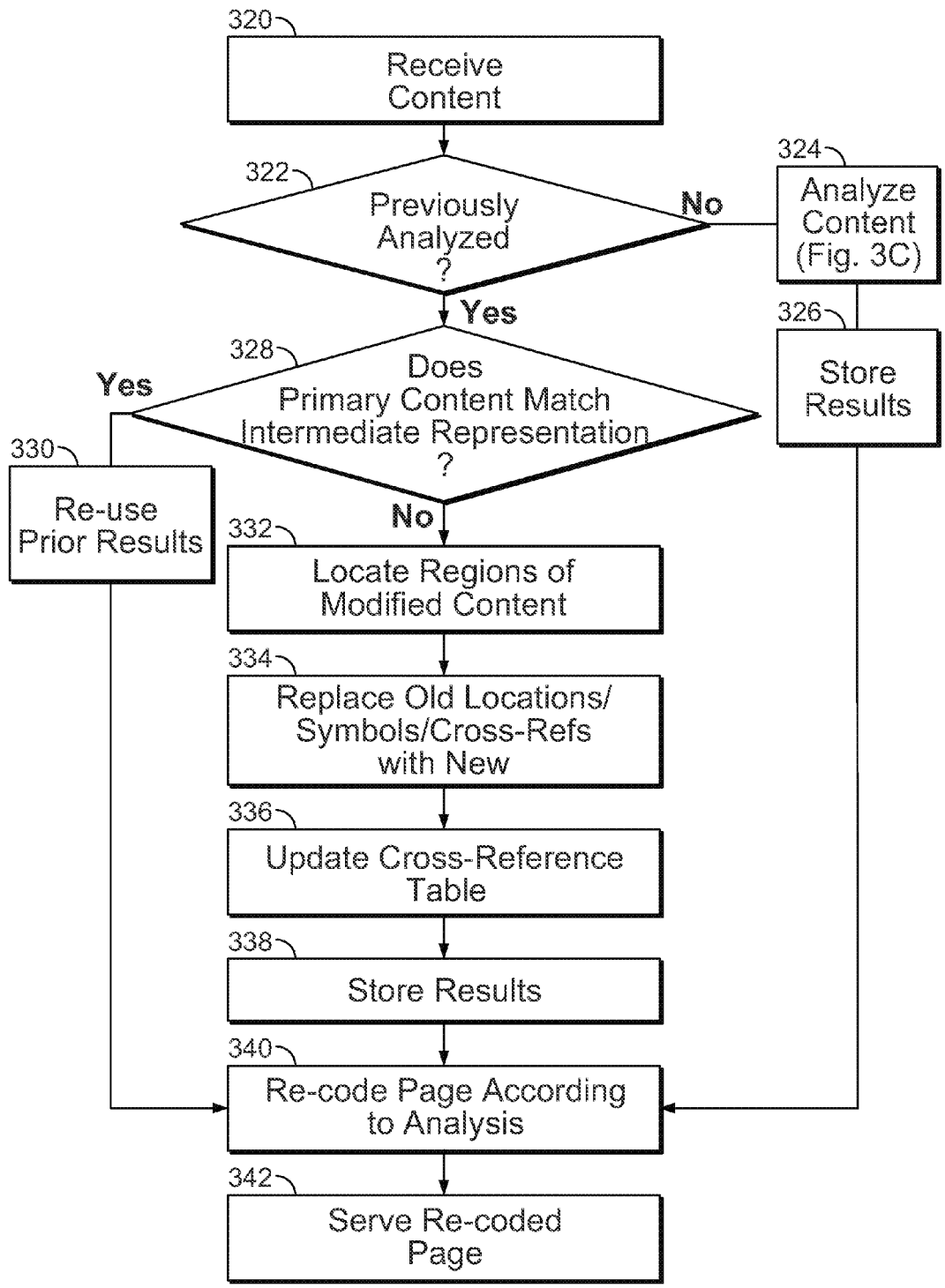
Figure 3C:
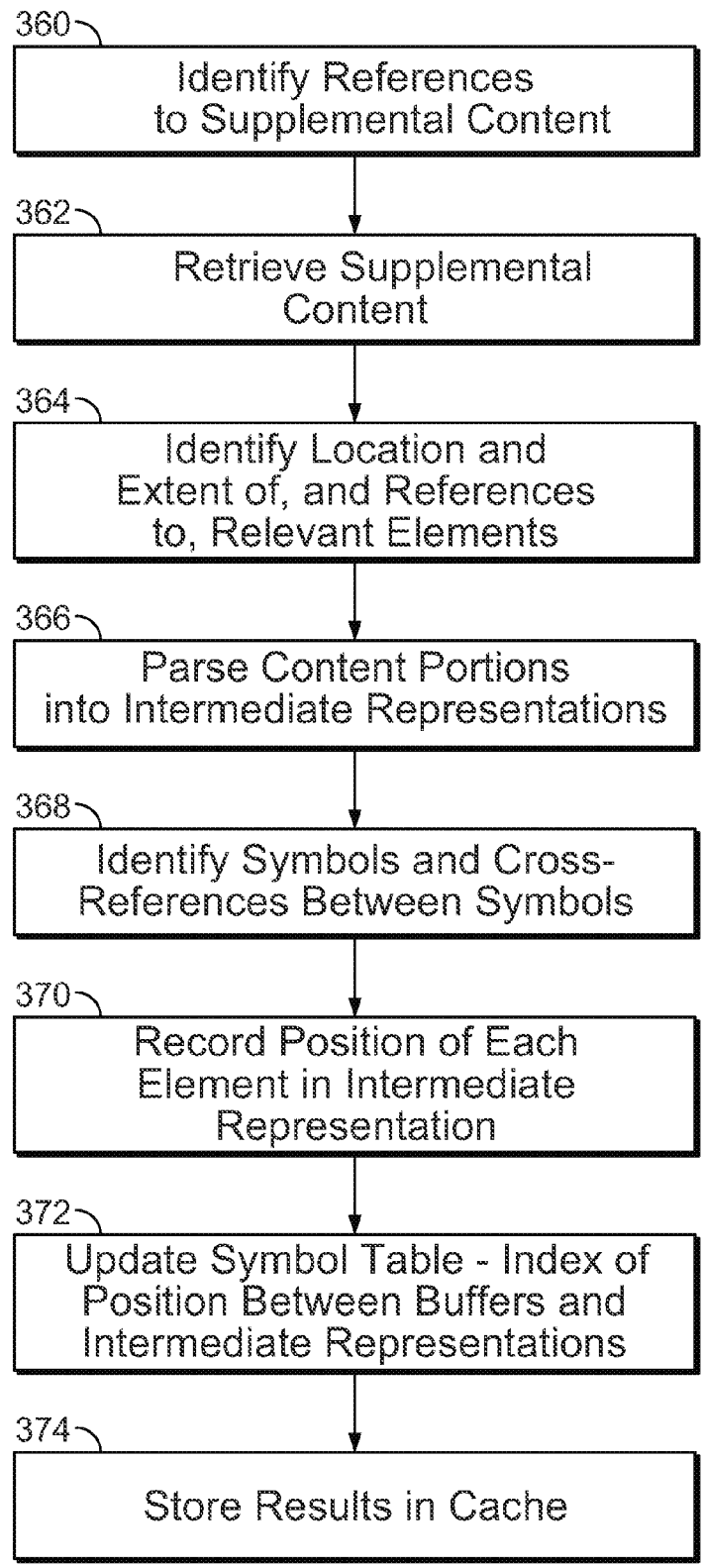
FIG. 3C is a flow chart of an example process for initially analyzing web code and mapping relationships in the code.

FIG. 3B is a flow chart of an example process for analyzing, in a cached manner, web code that is to be re-coded prior to being served. In certain implementations, the process shown in FIG. 3B may be performed by the system 120 described above with respect to FIG. 1B, and/or the system 200 described above with respect to FIG. 2.

At box 320, the process includes receiving content that is to be re-coded. The content may be received by an intermediate computing system logically located between a web server and a client device, such as the re-coder 124 shown in FIG. 1B. The content may include web code that corresponds to a resource provided by a web server, such as web server 126, in response to a request for the resource. The request may have been made by a client computer such as client device 122 in FIG. 1B. The content is received so that it may be re-coded from an original form provided by the web server 126 to a modified form before being delivered over a network, such as the Internet, to the client device 122.

The received content can include primary content and supplemental content, either of which may include static and/or dynamic content. Primary content is generally content that is served directly in response to a client request. For example, in a request for a web page, the primary content may be the HTML that defines the structure of the web page and that is located at a web address, such as a URL or URI, indicated in the request. Supplemental content can include any number of resources that are referenced by the primary content. In one example, the primary content includes HTML web code that includes an image tag that references a source address for an image file. The image, then, constitutes supplemental content. Supplemental content, such as the image referenced by the image tag, may be served from the same domain and/or web server that served the primary content, or it may be hosted and served from another domain and/or computing system. In another example, the primary content may reference supplemental content such as JavaScript or CSS. The JavaScript or CSS may be referenced from another file, or they may be provided, for example, in separate portions of the same file from which the HTML or other primary content was received.

At box 322, the process determines whether the received content has been previously analyzed. The analysis of the content is used to in order to perform coordinated modifications of the content so that the content can be re-coded without substantially affecting how the content is presented on a client computing device and to maintain equivalent functionality of the content from a user's perspective when it is executed on the client computing device. If it is determined that the content has not been previously analyzed, then the process proceeds to box 324, in which an intitial analysis of the content is performed. The process of initially analyzing the content will be further described with respect to FIG. 3C.

FIG. 3C is a flowchart of an example process for initially analyzing web code and mapping relationships in the web code. At box 360, the process includes identifying references to supplemental content. As has been described, the content initially received from a web server 126 in response to a request may be primary content, such as a web page or other web application, which includes references to supplemental content. The supplemental content can be located in a file or other data source external to the primary content, or even within a file or other data source that includes the primary content. Generally, however, the supplemental content is separate from the primary content in some logical fashion such that the primary content references the supplemental content and/or the supplemental content references the primary content. For instance, style information for a web page may be defined by CSS web code, interactive features of a web page may be executed according to JavaScript code, and other applications may be executed as applets, each of which can be referenced by a respective address to such supplemental content provided in the primary content web code.

At box 362, the process retrieves the supplemental content that was identified in box 360. For example, in the system depicted in FIG. 1B, the re-coder 124 determines an address, such as a URL or URI, for each identified instance of supplemental content, and then uses the identified addresses to retrieve the each instance of supplemental content. In one example, the re-coder 124 may determine that supplemental content for a particular resource includes CSS code and JavaScript code that are each hosted by the same web server that provided the primary content. The re-coder 124 may then generate separate HTTP requests to the web server to retrieve the CSS code and JavaScript code, respectively so that the supplemental content is available for analysis. Likewise, either or both of primary content and supplemental content may include further references to other supplemental content. Where the supplemental content is hosted by a web server other than the web server 126 that provided the primary content, the re-coder 124 may make separate requests to retrieve the supplemental content. For example, the primary content could include references to advertisements or images that are provided by a remote server different than the server that provided the primary content. In like manner, such as by using HTTP requests or another communication protocol, the supplemental content can be retrieved from the remote server and at least temporarily stored at the re-coder 124 for analysis.

At box 364, the process for initially analyzing web code that is to be re-coded includes identifying the location and extent of elements of the primary content and all references to those elements in either the primary content or supplemental content. Depending on the extent of the analysis, only a portion of all the elements in the primary content may be identified, or the process may identify the location and extent of elements in an entirety of the primary content. The elements in the primary content may correspond to elements of the web code for the primary content. For example, HTML elements may correspond to HTML tags such as <input>, <p>, <div>, <span>, and others.

Locations of the elements can be recorded in various manners. In some implementations, a unique ID or address of each element within a structure of the primary content is recorded. Other context information associated with the elements, such as content within or surrounding the elements may be recorded. In some examples, the locations can be recorded by noting an offset of the element within the content. For instance, an input element provided by the tag <input name="field1"/> can be signified by a value that represents it is in a particular position from the start of the document, such as the 120th tag in the document. In some implementations, the locations of elements can be determined using CSS3 selectors (e.g. form[id="form1"]), JavaScript query/select statements (e.g., document.getElementByID("Foo")), and/or using XPATH selectors, for example.

The process can also determine and record an extent of the elements included in the content. The extent of an element can be an indication of a portion of the content that the element spans. In the example of HTML, content is often nested within particular elements in a hierarchical fashion so that, for example, lower-level content inherits the properties of higher-level content. In one example a <form> tag may indicate the start of a particular form, which define various attributes for the elements within the form, and any form-related tags such as an <input> tag provided subsequent to the <form> tag and until a closing </form> tag is provided are deemed to be elements within the particular <form>. Thus, the <form> element can be said to extend within the content until the </form> tag is reached, and an indication of the extent of the element can be recorded along with a location identifier for the element.

Further in box 362, the process includes identifying references to the elements in the received content. Identifying the references can include, in certain implementations, identifying those elements in the primary content and/or the supplemental content that refer to another element that has been identified within the primary content. For example, a simple web page may be defined by the following HTML code:

```
<html>
<head>
<link rel="stylesheet" type="text/css" href="shapeStyle.css">
<script>
function shapeFunction( )
{
document.getElementById("shape")
   .innerHTML="Example Function Text";
}
</script>
</head>
<body>
<p id="shape">Dynamic Text</p>
<button name="exampleButton" type="button" onclick="shapeFunction( )">Click to Change</button>
</body>
</html>
```

In this example, the HTML code is primary content because it was provided by the web server 126 to the re-coder 124 in response to a particular request for a web page corresponding to the HTML code. The HTML includes a JavaScript function inline in the body of the page, and also includes a reference to an external stylesheet, shapeStyle.css. The shapeStyle.css file is supplemental content that is identified and retrieved by the re-coder 126, as described in boxes 360 and 362. The JavaScript function, however, is included in the primary content. One of the elements identified in the analysis of the page is the element corresponding to the <button> tag. The <button> tag includes an "onclick" attribute that causes the "shapeFunction( )" JavaScript to be called when the button is selected by a user. Accordingly, the re-coder 124 determines that the <button> element references the JavaScript function, which is another element within the primary content. Likewise, the document.getElementByID element references the <p> tag whose id is "shape," and this reference is also recorded in the analysis. In like manner, the process identifies and records references between elements in the primary HTML content and the supplemental content, shapteStyle.css.

The process illustrated in FIG. 3C can include a "full analysis" of all elements in the primary content, or may instead include an analysis of just a portion of the elements in the primary content. The latter case may be referred to as a "modification-specific analysis." The full analysis provides the most flexibility in re-coding content because a complete representation of the web code corresponding to a requested resources is analyzed and stored. Results of the full analysis can then be used to perform coordinated modifications of any portion of the web code. In other implementations, the process may perform modification-specific analysis to reduce the computational expense of the analysis and to minimize latency in responding to a request as compared to the full analysis. Under the modification-specific analysis model, less than all of the elements in the primary content are analyzed. The portion of the elements that are selected for analysis can be determined in various manners. For instance, an operator of the system 120 may configure the system to operate in various modes that govern the types of re-coding that will occur. For example, in a mode in which only particular types of elements are to be recoded, such as form tags in HTML code, the system may focus its analysis on those types of elements in the modification-specific analysis. In certain implementations, the analysis may be limited to dynamic content—i.e., portions of content that change relatively frequently between requests for the content. Often, a requested resource includes both static content that change relatively infrequently, and dynamic content that changes more frequently. Using modification-specific analysis, only information related to the dynamic content is recorded. For example, in a web page that has a standard structure served to all users, but that also includes personalized modules such as advertisements that are uniquely targeted to particular users, the process may limit the analysis of the web page in subsequent requests for the page to only those portions of the web page that correspond to the personalized modules. In certain implementations, an operator may configure a system 120 that implements the process to operate in either a full-analysis mode or a modification-specific analysis mode. Thus, in the modification-specific analysis mode, only locations, extent of, and references to a portion of the elements are identified and recorded. The system 120 may also select one mode over the other automatically based on an optimization technique and desired system performance characteristics.

At box 366, the process parses the web code for a requested resource into intermediate representations. FIG. 3C shows the web code as being parsed in box 366 after the operations of identifying the location, extent of, and references to relevant elements in box 365. In certain implementations, however, the order of operations may be reversed such that the intermediate representations are determined before the operations of box 365. In such implementations, the relevant elements can be identified from the intermediate representations rather than, for example, the original web code.

The web code may be parsed to generate various types of intermediate representations. In some examples, the type of intermediate representation that is generated from the parsing depends on the type of web code being parsed. For instance, HTML code may be parsed into a Document Object Model (DOM) intermediate representation, while JavaScript code may be parsed into an Abstract Syntax Tree (AST) intermediate representation. Thus, when all of the web code for a requested resource is parsed, including web code for both primary and supplemental content, multiple intermediate representations of different types may be generated that represent respective types of web code for the requested resource. For example, a web page that includes both HTML in its primary content and that references JavaScript as supplemental content may be parsed to generate a first intermediate representation in the form of a DOM for the HTML primary content, and a second intermediate representation in the form of an AST for the JavaScript supplemental content. In other implementations, a common intermediate representation type may be used to represent multiple different types of web code as well. Notably, the information determined in box 365, including location, extent, and references to relevant elements can be determined from and recorded in either its original representation in the web code (e.g., JavaScript, HTML), or its intermediate representations (e.g., AST, DOM), or both.

The process of analyzing web code that is to be re-coded continues at box 368, where symbols and cross-references between the symbols are identified within the primary and supplemental content. The symbols correspond to elements in either the primary or supplemental content, and can be represented either in original form from received web code or by representations in the intermediate representations generated at box 366. For example, a symbol for a <form> tag may be represented by its HTML tag or by an identifier of the tag in a DOM representation of the HTML page from which it was parsed.

Moreover, the process at box 368 further includes identifying cross-references between symbols in the primary and supplemental content. In some implementations, the cross-references may have been identified at box 364 in which references were identified to relevant elements of the web code. Identifying cross-references among the symbols can be carried out in a similar fashion. Cross-references between symbols that correspond to elements in both primary and supplemental content are identified. The cross-references can be identified between symbols within the primary content, symbols within the supplemental content, or between symbols in primary and supplemental content. One example of a cross-reference between symbols within primary content is a CSS selector in an inline style sheet that refers to elements within an HTML page. Another example is an inline JavaScript function that is called as an event handler of an HTML input element. Examples of cross-references of symbols between primary and supplemental content include a CSS selector in an external style sheet that refers to elements within an HTML page, and a JavaScript function from an external library that is used in an inline function on a primary HTML page.

At box 370, information about each element in the intermediate representations of the analyzed web code is recorded. The recorded information can include a location or other positional information for each element in the intermediate representations. In some examples, the location or positional information can be recorded as data that indicates a relative position or offset of the element, as a node location in a hierarchical representation (e.g., in a tree structure a third-generation element might be indicated in a representation as 3.12.7, in which each (.) separated numeral identifies a node in the tree hierarchy at respective levels/generations of the tree), using CSS3 selectors, and/or by using XPATH selectors. In certain implementations, the recorded information for each element can correspond to information about the symbols for each element identified in box 368.

Information that is stored for each element in the intermediate representation can be associated with respective information for the elements from the original web code. In this manner, location or positional information for each element may be recorded from both the originally received and intermediate representations of web code for each element. The elements may be indexed and the location information stored in a database or other information repository to support efficient, bi-directional lookup of an element's location in either an original representation of web code or an intermediate representation. For example, an intermediate representation of a <div> tag location in a DOM can be stored or otherwise recorded in association with other information that indicates where the <div> tag was located in the original web code (e.g., a byte-level location of the tag in a data stream for the original web code, or other relative positional information). When a symbol is identified that corresponds to the <div> tag in either the original code or the intermediate representation, its corresponding location can be quickly identified from one representation to the other using the lookup table.

At box 374, the results of the initial analysis of a requested resource are cached so that all or a portion of the analysis can be reused in subsequent requests for the resource. In some implementations, a re-coder system can maintain separate caches for primary and supplemental content. For example, a primary content cache can include the results of the analysis of primary content, such as identified elements and corresponding symbols, location and extent information of the elements, cross-reference data, a representation of the original web code, the intermediate representation, and a lookup table to correspond location or other positional information for the elements between the original web code representation and the intermediate representation of the primary content. A separate, supplemental cache can be maintained in a like manner for supplemental content. Some or all of the information described herein may be stored, and in some instances, the primary content cache may include different types or quantity of information than the supplemental content cache. For example, the primary content cache may include all information resulting from a detailed analysis of a requested resource, whereas the supplemental cache includes just a portion of the results.

In some implementations, the supplemental content cache may be configured to only store the original code or another representation of the most recently retrieved supplemental content, and to not retain results of the detailed analysis of the supplemental content. For example, in an initial request for a resource, detailed analysis can be performed on the resource's primary and supplemental content. The results of the analysis for the primary content may be cached, whereas the results of the supplemental content may not be retained for use in subsequent requests. In certain implementations, however, the full results of an analysis of supplemental content may be cached so that the results may be reused in subsequent requests for the same resource, or the results may be shared and reused if the same content is also referenced by other requested resources. For example, multiple pages in a website may each reference the same external CSS stylesheet. The first time that one of the pages is requested, the stylesheet may be analyzed and analysis results stored in supplemental content cache. In subsequent requests by the same or different users for the same page or other pages in the website, the initial analysis results for the stylesheet can be reused from cache without having to do a completely new analysis of the stylesheet each time a page is requested.

The extent of the analysis results that are cached in either the primary content cache or the supplemental content cache can be selectively varied. In one example, the re-coder 124 can operate in either a full-analysis mode or a modification-specific analysis mode. In full-analysis mode, upon performing detailed analysis of a web resource, the re-coder 124 can cache full results of the analysis, at least of the primary content. In this way, the re-coder 124 will have all the information that it needs to perform a wide range of re-coding operations for the resource, even if the re-coder 124 only uses a portion of these operations in response to a given request. However, because the full analysis results have been cached, the re-coder 124 can apply any of the re-coding operations in subsequent requests without needing to perform another full analysis of the resource. Thus, full analysis mode provides the re-coder 124 with the greatest flexibility in its re-coding operations. In other implementations, the re-coder 124 can be configured to operate in a modification-specific analysis mode. In this mode, only a limited portion of analysis results are cached that is relevant to perform a specific set of re-coding operations on the content. For example, if the re-coder 124 is configured to obfuscate a web page only by changing the names or values of existing elements in the page, then a narrower set of re-coding operations are employed, and thus less information is needed to be cached from an analysis. On the other hand, if the re-coder 124 is configured to perform additional re-coding operations such as introducing distractor fields that were not originally present in a web page, or to otherwise change the structure of the page, then the system may benefit from the full-analysis caching mode.

As another example full reanalysis may be especially beneficial where a policy that defines what modifications are to be performed on a page or other resource is changing frequently. In such a situation, caches analysis results would likely have to be discarded in a modification-specific analysis mode. In contrast, they would not have to be discarded as much in a full analysis mode.

Returning now to the process shown at box 326 in FIG. 3B, the results of the initial analysis are stored. The results may be stored in a manner described above with respect to box 374 in FIG. 3C.

At box 322, the process can recognize when web code for a particular requested resource has been previously analyzed. To determine whether a subsequent request may be for a resource that has been previously analyzed, a web address to which the subsequent request is directed can be compared to web addresses of previously analyzed resources. For example, re-coder 124 may receive an HTTP request from a client device 122 for a web page located at www.example.com/news/2013/technology234.html. The re-coder 124 then compares the address of the requested page with a stored list of identifiers for web pages and other resources that have been previously analyzed. In some instances, modified addresses, such as partial URLs, are compared so as to isolate relevant address information from portions of the address that may identify a user agent, for example.

In cases where collisions occur (i.e., where an identifier for a subsequently requested resource potentially matches identifiers of multiple previously analyzed resources), further operations can be performed to select a particular one of the potential matches that likely corresponds to the intended resource. For instance, primary content for the subsequently requested resource can be retrieved and compared to representations of the potential matches. A best match can be determined after comparing the retrieved resource with each of the potential matches, and/or a most likely match can be determined when the comparison satisfies a similarity threshold. For example, in a collision that identifies four potential matches for a requested resource, if the retrieved primary content was determined to be sufficiently similar or identical to the first potential match to which it is compared, then no further comparisons of the other potential matches would be required. If none of the potential matches are sufficiently similar to the retrieved requested resource, then the process may determine that the request is for a resource that has not been previously analyzed, and the process proceeds to box 324 as described above.

Upon determining that the requested resource has been previously analyzed, at box 328, the process determines whether the received content for the requested resource matches an intermediate representation of a previously analyzed resource. In some implementations, this determination is made by comparing the primary content for a requested resource with the corresponding intermediate representation of the primary content of a previously analyzed resource that was identified in box 322. For instance, the re-coder 124 implementing the process shown in FIG. 3B can obtain the requested resource, e.g., technology234.html. The web code for technology234.html can be parsed to generate a current DOM representation of the requested resource, which is compared to the DOM of the matched previously analyzed resource. If the DOMs are identical or otherwise determined to be sufficiently equivalent, then the process proceeds to box 330 and the cached results of the prior analysis can be re-used. Others manners of comparing content of the requested resource with a previously analyzed resource can be employed as well, including a byte-by-byte analysis of the web code of the resources if the web code for the primary content of the previously analyzed resource has been cached.

If the primary content of a requested resource matches primary content from a previously analyzed resource, further comparison is made between supplemental content. Comparison of supplemental content can be performed in substantially the same manner as comparison of primary content. In certain implementations, however, comparison of supplemental content may be abbreviated or otherwise less computationally expensive and faster than comparison of primary content. For example, rather than generating complex intermediate representations or performing byte-by-byte analysis of all the supplemental content that a web page references, HTTP headers for the supplemental content can be checked to determine whether a cached representation of the supplemental content has expired, or checksum techniques can be used. The process may also periodically retrieve supplemental content to verify that recorded information about the supplemental is current, and if it is not, then it may be flagged. In such implementations, the process may only retrieve supplemental content for further analysis if it has been flagged. It should be noted that in certain implementations, the process may also forgo comparison of supplemental content.

The process at box 328 can in some cases introduce latency in responding to a request, and therefore the process can determine whether re-use of cached results or re-analysis is likely to be most efficient. In some cases, the choice of "re-use" or "re-analysis" can be determined upon receiving the primary content for a requested resource. The process determines if it would likely be faster or computationally cheaper to perform re-analysis ex ante rather than first determining whether the requested resource matches a previously analyzed resource. For example, if the process can perform a detailed analysis of a requested resource faster than it can determine a match to a cached resource, then the process can elect to perform a detailed analysis and proceed to box 324 and FIG. 3C rather than re-using a cached resource. This may occur, for example, if a most recent version of a web page has significantly changed, includes fewer references to supplemental content, or when collisions occur when identifying potentially matched web addresses.

If a requested resource does not identically or nearly identically match (e.g., does not match a threshold similarity score) a cached representation of the resource, then the resource has been modified and the process proceeds to box 332, in which the results of a previous analysis are at least partially re-used. Re-use of cached analysis results is generally beneficial because it obviates the need to perform detailed analysis of a resource each time it is requested. For high volume requests of particular resources, re-using cached analysis results can significantly reduce computational demands and also reduce latency associated with analysis. In some implementations, the process can determine that a resource has been modified in a manner that requires re-analysis at least in part. In that case, the process can return to box 324 and FIG. 3C. In other cases, re-use of cached results is determined to be appropriate. For example, where the modifications to a requested resource do not affect elements that are the subject of coordinated modifications or other re-coding, then re-analysis is not necessary. For instance, if planned re-coding only involves changing form input field names in a webpage, and the requested webpage does not include any modifications to its forms since the last analysis of the page, then the process determines that further analysis is not required and analysis re-use techniques can be employed instead.

At box 332, the process proceeds to locate regions of modified content within the requested resource. Modified content can include any changes to the web code of the requested resource over its corresponding previously analyzed resource. For example, in a web page, changes may include differences in either the structural or non-structural elements of the page. Structural changes can include, for instance, the addition, modification, re-arrangement, or deletion of HTML tags. Non-structural changes can include changes to textual content that is presented in a display of the page, for example. In some implementations, the regions of modified content can be identified by comparing a representation of the requested resource with information in the cached analysis results, such as an intermediate representation. For example, in a subsequent request for a personalized homepage of a user that includes current news and weather information, the process can determine that the either or both of the news and weather sections of the page have changed since prior information about the page was last cached. The process can perform byte-by-byte analysis of the homepage's primary content to determine an element of the page that has been modified. In some implementations, another intermediate representation of the page can be generated to directly compare with the cached intermediate representation. Thus, if a DOM or AST representation was cached during prior analysis of the homepage, then a DOM or AST representation can be similarly generated for the subsequently requested resource, and the results compared. In some implementations, location or other positional information for modified elements can be determined by referencing a lookup table where such information has been stored. The regions of modified content can thus be specifically identified by location information of elements that correspond to the modified content. Located regions of modified content may be in primary content, supplemental content, or both.

The process proceeds, at box 334, to update portions of analysis results in the primary and supplemental cache to reflect the identified modifications in the requested resource. Old symbols, location data, extent data, cross-references, and other stored information about the previously analyzed resources are replaced with similar information for the modified resource. In effect, a partial analysis of the modified resource is performed with respect to relevant elements in the resource that are affected by the modification. For example, if a <table> HTML tag that was originally present in a web page is determined to have been deleted, then the corresponding representation of that tag is also removed from the cached intermediate representation of the web page. Other elements in the page may have assumed new positions as a result of the tag having been removed, and thus location or other positional information for the effected elements can be updated in the cache. Links and references to the tag can also be changed accordingly.

The extent of the process at box 334 of updating cached analysis results to reflect changes in a requested resource can vary according to a mode of the process. As described above with respect to FIG. 3C, the process can operate in full-analysis mode or modification-specific analysis mode. In full-analysis mode, the process identifies all regions of modified content for a requested resource and updates the cached analysis results for each identified region of modified content. In full-analysis mode, the cached analysis is updated for a resource even when the identified modifications do not pertain to elements in the resource that will be re-coded to obfuscate operation of a website. By contrast, in modification-specific analysis mode, cached analysis results are updated only where the primary or supplemental content for a requested resource has been modified and the modifications are with respect to elements in web code that are subject to be being re-coded.

Consider the following example of how full-analysis mode compares with modification-specific analysis mode. First, the process can generate and record detailed analysis results for an original web page defined by the following example HTML code:

```
<html>
<head>
<title>Original Page</title>
</head>
<body>
<script>
function exampleFunction( )
{
document.getElementById("example")
.innerHTML="Hello World";
}
</script>
<form    name="input"    action="get_request.asp" method="get">
Username: <input type="text" name="user">
<input type="submit" value="Submit">
</form>
<p id="paragraphidentifier">Web security</p>
<img src="image1.jpg">
</body>
</html>
```

In a subsequent request for the above web page, the code may be modified as follows:

```
<html>
<head>
<title>Dynamic Page</title>
</head>
<body>
<script>
function exampleFunction( )
{
document.getElementById("example")
.innerHTML="Hello World";
}
</script>
<form name="input" action="get_request.asp" method="get">
Username: <input type="text" name="user">
<input type="submit" value="Submit">
</form>
<p id="paragraphidentifier">Web security</p>
<img src="image2.jpg">
<p id="paragraphidentifier">Online security</p>
</body>
</html>
```

In the modified version of the code, several changes have been made, including to the title, the referenced image, and addition of a paragraph. In full analysis mode, the process would identify and record the changes to each of these elements, regardless of whether the modified elements are subject to being re-coded. However, if a particular re-coding scheme were limited to renaming form field values—none of which have changed in the updated code—then under the modification-specific analysis mode, the process can determine that mapping and other information in a cached results analysis does not need to be modified.

At box 388, the process stores results of the updated analysis for a particular resource. In some implementations, the manner and location of recording updated analysis information may be different depending on whether the changes were made in primary content or supplemental content. The re-analysis results for primary content can be updated in primary content cache, and the re-analysis results for supplemental content can be updated in supplemental content cache.

The process then proceeds to box 390, where the received content for a requested resource is re-coded using a cached analysis for the requested resource. Re-coding is generally performed so as to deflect automated attacks against a user or a web server by illegitimate code that is programmed to exploit the web code of a web page or other requested resource on a client device. The process can re-code the same resource differently each time that resource is served in order to create a "moving target" against attempts to exploit the code. For example, a first user at a first client device can make an initial request for a resource. In response, the process receives a response from a web server, performs detailed initial analysis on the resource that the web server provided in response, caches results of the analysis, and uses the results to safely re-code elements of the resource's web code in a coordinated manner between the resource's primary content and supplemental content.

The safe, coordinated re-coding techniques ensure that the resource maintains substantially the same presentation and functionality from the user's perspective at the client device. That is, the user should generally not be able to tell when or how a requested page has been re-coded when he or she interacts with the page. When the same user makes a subsequent request from the first client device for the same resource, such as in a separate session, the process can perform the operations described herein of re-using at least a portion of the previous analysis of the resource to facilitate efficient re-coding. In like manner, when a second user at a second client device makes multiple requests for the resource that was initially requested by the first user, the resource is re-coded differently in response to each request. At box 392, the re-coded page is served to the client device in satisfaction of a request. Thus, when a page changes from one serving to the next and the changes are not relevant to the modifications that the re-coding makes, the process may take the cached intermediate page, replace the relevant portions with the changed content and apply the static modifications, all without further analysis. Process performance improvements may thus be achieved by such efficiency increases.

The re-coded content may be statically recoded or dynamically re-coded. Static re-coding occurs when a structural modification is made to the code, but that modification does not change across different servings of the resource. Dynamic re-coding occurs when the code is re-coded, and such re-coding changes with each act of serving the resource. For example, if the process injects a new JavaScript element into the code, but in the same place in the same page every time the corresponding resource is loaded, the re-coding is considered to be static (even though names and such information inside the JavaScript element may change).

In some implementations, the process can also cache re-coded resources to facilitate even more efficient operations. For example, each of the re-coding operations in the process can be either a static re-coding operation or a dynamic re-coding operation. Static re-coding operations do not alter the structure of requested resource, whereas dynamic re-coding operations do alter structure. Generally, the re-coding operations can occur in phases in which the static re-coding is first performed in a static re-coding phase, and then dynamic operations follow in a dynamic re-coding phase. For example, changing the names or values of elements in a resource's web code are static changes. Thus, in the static modification phase, an example hyperlink in an HTML document may be changed from <a href="exampletarget.html"> to <a href="Ag^j*wef.f$he">. Other non-structural changes that, for example, do not change the DOM structure of a web page, can be made to elements throughout the HTML document and the changes may be coordinated within and between primary and supplemental content. After the static changes, the process can then make structural changes in some implementations in the dynamic re-coding phase. Dynamic changes can include re-arranging existing elements in the page or inserting elements in a page, such as distractor form fields, that were not present in the resource as originally served.

Results of the static re-coding phase can be cached as an intermediate re-coded response that can be re-used in subsequent requests for a resource. In one implementation, when the process performs static re-coding operations on a resource in response to a first request for the resource, and after the initial detailed analysis of the resource is performed as described with respect to FIG. 3C, placeholder values are re-coded into the web code for the resource in each location where a static modification is to be made. For example, if the static modifications include changing the name of each JavaScript function in the web code, then distinct placeholder values can be coded into the JavaScript that replace the names of the original functions. The re-coded resource in which placeholder values have been inserted where static modifications are to be made is an intermediate re-coded response, which is cached for later re-use. The placeholder values in the intermediate re-coded response are not the final values that will be served to a client device. Instead, different final values will replace the placeholder values in response to each request for the resource so that the values change in response to each request. The functions used to generate the final values can also be cached with the intermediate re-coded response. By caching the intermediate-recoded responses, the process is able to reuse the results of an initial static re-coding phase for the resource. As such, in subsequent requests for the resource, the static re-coding phase can be bypassed. The process instead accesses the intermediate re-coded response, identifies each placeholder value using a search and replace algorithm or cached location information for each placeholder value, and uses known functions to generate final values to replace the placeholder values. The process can then proceed with re-coding in the dynamic re-coding phase.

Figure 4:
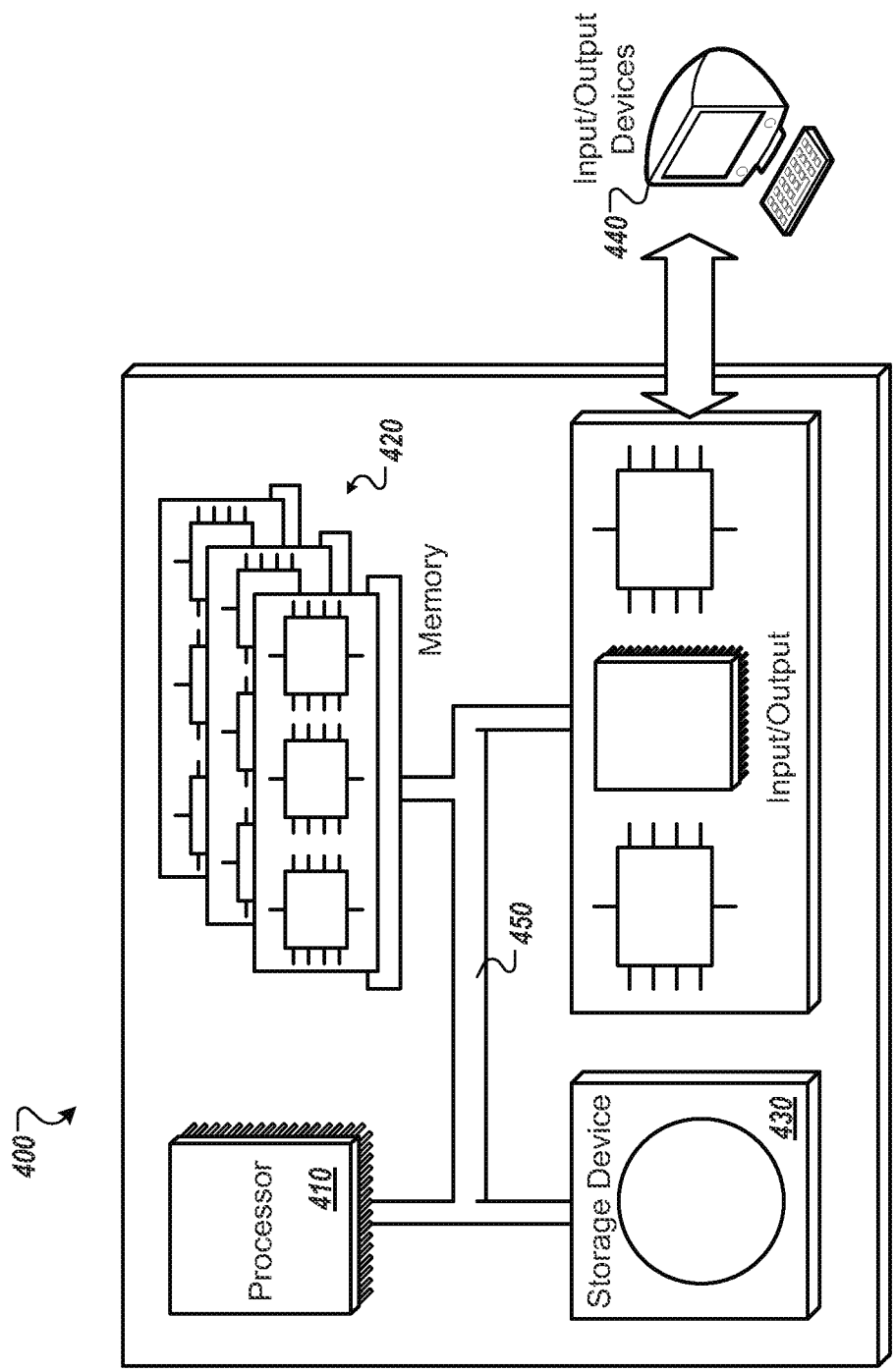
FIG. 4 is a schematic diagram of an example computer system that can be used in implementing the systems and processes described in this document.

FIG. 4 is a schematic diagram of a computer system 400. The system 400 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented system, comprising:
   a data structure stored on the system that (1) correlates web code elements that are dependent on each other in a first instance of web code and (2) indicates locations of the web code elements in the first instance of the web code; and
   one or more devices having non-transitory media storing instructions that when executed perform operations that include:
      determining whether a first representation of the web code that corresponds to the first instance of the web code matches a second representation of the web code that corresponds to a second instance of the web code;
      in response to determining that the first representation of the web code does not match the second representation of the web code:
         (1) identifying a portion of the second representation of the web code that is determined not to match a corresponding portion of the first representation of the web code, and
         (2) generating an updated data structure by updating a portion of the data structure that pertains to web code elements located in a portion of the first instance of the web code that corresponds to the portion of the first representation of the web code that is determined not to match the identified portion of the second representation of the web code; and
      re-coding, using the updated data structure and before serving the second instance of the web code to a client device, the second instance of the web code so as to interfere with an ability of malware to exploit the second instance of the web code at the client device.

2. The computer-implemented system of claim 1, wherein the first representation of the web page code comprises a first document object model generated from the first instance of the web code, wherein the second representation of the web code comprises a second document object model generated from the second instance of the web code.

3. The computer-implemented system of claim 1, wherein the data structure correlates instances of web code elements served by a first server system with (a) other instances of the same web code elements served by the first server system, and (b) other instances of the same web code elements served by a second server system that is operated by an organization separate from an organization that operates the first server system.

4. The computer-implemented system of claim 1, wherein the first and second representations of the web code comprise abstract syntax trees formed from the first instance of the web code and the second instance of the web code, respectively.

5. The computer-implemented system of claim 1, wherein the first instance of the web code and the second instance of the web code both correspond to a web page located at a same web address, wherein the first instance of the web code and the second instance of the web code are served by a web server system at different times, wherein a portion of the second instance of the web code is different than a corresponding portion of the first instance of the web code.

6. The computer-implemented system of claim 1, wherein the data structure identifies which elements in the initial instance of the web code are to be re-coded during re-coding of the web code, wherein elements not identified in the data structure as elements that are to be re-coded are not re-coded during re-coding of the second instance of the web code.

7. The computer-implemented system of claim 1, wherein the operations further include:
   determining whether a third representation of the web code that corresponds to a third instance of the web code matches a fourth representation of the web code that corresponds to a fourth instance of the web code, and
   based on a determination that the third representation of the web code matches the fourth representation of the web code, re-coding the fourth instance of the web code using the updated data structure, without analyzing the fourth instance of the web code to determine which elements of the fourth instance of the web code, out of all elements previously identified as elements to be re-coded, should be updated in the data structure.

8. The computer-implemented system of claim 1, wherein a first set of elements that are correlated in the data structure includes at least two of a hypertext markup language (HTML) element, a cascading style sheet (CSS) element, and a JavaScript element.

9. The computer-implemented system of claim 1, wherein a first set of elements that are correlated in the data structure includes elements from at least one of a DOM-aware programming language and a stylization-type programming language for applying styling to an electronic resource.

10. A computer-implemented system, comprising:
  stored maps that (1) correlate web code elements having representations in an initial instance of web code that are dependent on each other and (2) indicate locations of the web code elements in the initial instance of the web code; and
  one or more devices having non-transitory media storing instructions that when executed perform operations that include:
    receiving a subsequent instance of the web code from a web server system in response to a request from a client computing device for a web page that corresponds to the subsequent instance of the web code; and
    determining whether a representation of the initial instance of the web code that was created by at least partially executing the initial instance of the web code matches a representation of the web code that was created by at least partially executing the subsequent instance of the web code;
    based on a determination that the representation of the initial instance of the web code does not match the representation of the subsequent instance of the web code, analyzing the subsequent instance of the web code using the stored maps to determine which elements of web code, out of all elements previously identified as elements to be re-coded when the web code is served, should be updated in the stored maps;
    re-coding, using the stored maps and before the web code is transmitted to the client computing device, the subsequent instance of the web code to generate re-coded web code, the re-coding including substituting original elements in the subsequent instance of the web code with re-coded elements by identifying locations of the original elements in the subsequent instance of the web code using the stored maps, and replacing at least two of the original elements that are correlated in the stored maps with at least two re-coded elements that are determined to maintain the dependency of the at least two original elements in that a functionality or appearance of the web page, when executed, is not substantially affected by the re-coding; and
    transmitting the re-coded subsequent instance of the web code to the client computing device.

11. The computer-implemented system of claim 10, wherein re-coding the subsequent instance of the web code to generate the re-coded web page code includes re-coding a first portion of the subsequent instance of the web code that was previously re-coded in the initial instance of the web code, but not re-coding a second portion of the subsequent instance of the web code that had been previously re-coded in the initial instance of the web code.

12. The computer-implemented system of claim 10, wherein analyzing the subsequent instance of the web code using the stored maps comprises analyzing a first portion of the subsequent instance of the web code that corresponds to respective portions of the first representation of the initial instance of the web code and the representation of the subsequent instance of the web code that are determined to not match, but not analyzing a second portion of the subsequent instance of the web code that corresponds to respective portions of the representation of the initial instance of the web code and the representation of the subsequent instance of the web code that are determined to match.

13. A computer-implemented method, comprising:
  obtaining, by a computing system, mapping data that (1) correlates web code elements that are dependent on each other in a first instance of web code and (2) indicates locations of the web code elements in the first instance of the web code; and
  determining whether a first representation of the web code that corresponds to the first instance of the web code matches a second representation of the web code that corresponds to a second instance of the web code;
  in response to determining that the first representation of the web code does not match the second representation of the web code:
    (1) identifying a portion of the second representation of the web code that is determined not to match a corresponding portion of the first representation of the web code, and
    (2) generating updated mapping data by updating a portion of the mapping data that pertains to web code elements located in a portion of the first instance of the web code that corresponds to the portion of the first representation of the web code that is determined not to match the identified portion of the second representation of the web code; and
  recoding, using the updated mapping data and before serving the second instance of the web code to a client device, the second instance of the web code so as to interfere with an ability of malware to exploit the second instance of the web code at the client device.

14. The computer-implemented method of claim 13, wherein the first representation of the web code comprises a first document object model generated from the first instance of the web code, wherein the second representation of the web code comprises a second document object model generated from the second instance of the web code.

15. The computer-implemented method of claim 13, wherein the mapping data correlates instances of web code elements served by a first server system with (a) other instances of the same web code elements served by the first server system, and (b) other instances of the same web code elements served by a second server system that is operated by an organization separate from an organization that operates the first server system.

16. The computer-implemented method of claim 13, wherein the first and second representations of the web code comprise abstract syntax trees formed from the first instance of the web code and the second instance of the web code, respectively.

17. The computer-implemented method of claim 13, wherein the first instance of the web code and the second instance of the web code both correspond to a web page located at a same web address, wherein the first instance of the web code and the second instance of the web code are served by a web server system at different times, wherein a portion of the second instance of the web code is different than a corresponding portion of the first instance of the web code.

18. The computer-implemented method of claim 13, wherein the mapping data identifies which elements in the web code are to be re-coded during re-coding of the web code, wherein elements not identified by the mapping data as elements that are to be re-coded are not re-coded during re-coding of the second instance of the web code.

19. The computer-implemented method of claim 13, further comprising:
  determining whether a third representation of the web code that corresponds to a third instance of the web code matches a fourth representation of the web code that corresponds to a fourth instance of the web code, and based on a determination that the third representation of the web code matches the fourth representation of the web code, re-coding the fourth instance of the web code using the updated mapping data, without analyzing the fourth instance of the web code to determine which elements of the fourth instance of the web code, out of all elements previously identified as elements to be re-coded, should be updated in the mapping data.

20. The computer-implemented method of claim 13, wherein a first set of elements that are correlated in the mapping data includes at least two of a hypertext markup language (HTML) element, a cascading style sheet (CSS) element, and a JavaScript element.

21. A computer-implemented method, comprising:

accessing, by a computing system, one or more stored maps that (1) correlate web code elements having representations in an initial instance of web code that are dependent on each other and (2) indicate locations of the web code elements in the initial instance of the web code;

receiving a subsequent instance of the web code from a web server system in response to a request from a client computing device for a web page that corresponds to the subsequent instance of the web code; and determining whether a representation of the initial instance of the web code that was created by at least partially executing the initial instance of the web code matches a representation of the web code that was created by at least partially executing the subsequent instance of the web code;

based on a determination that the representation of the initial instance of the web code does not match the representation of the subsequent instance of the web code, analyzing the subsequent instance of the web code using the one or more stored maps to determine which elements of web code, out of all elements previously identified as elements to be re-coded when the web code is served, should be updated in the one or more stored maps;

re-coding, using the one or more stored maps and before the web code is transmitted to the client computing device, the subsequent instance of the web code to generate re-coded web code, the re-coding including substituting original elements in the subsequent instance of the web code with re-coded elements by identifying locations of the original elements in the subsequent instance of the web code using the one or more stored maps, and replacing at least two of the original elements that are correlated in the one or more stored maps with at least two re-coded elements that are determined to maintain the dependency of the at least two original elements in that a functionality or appearance of the web page, when executed, is not substantially affected by the re-coding; and transmitting the re-coded subsequent instance of the web code to the client computing device.

22. The computer-implemented method of claim 21, wherein re-coding the subsequent instance of the web code to generate the re-coded web code includes re-coding a first portion of the subsequent instance of the web code that was previously re-coded in the initial instance of the web code, but not re-coding a second portion of the subsequent instance of the web code that had been previously re-coded in the initial instance of the web code.

23. The computer-implemented method of claim 21, wherein analyzing the subsequent instance of the web code using the stored maps comprises analyzing a first portion of the subsequent instance of the web code that corresponds to respective portions of the representation of the initial instance of the web code and the representation of the subsequent instance of the web code that are determined to not match, but not analyzing a second portion of the subsequent instance of the web code that corresponds to respective portions of the representation of the initial instance of the web code and the representation of the subsequent instance of the web code that are determined to match.

\* \* \* \* \*